(12) United States Patent
Ying et al.

(10) Patent No.: US 11,647,513 B2
(45) Date of Patent: May 9, 2023

(54) USER EQUIPMENT, A BASE STATION APPARATUS, A COMMUNICATION METHOD OF A USER EQUIPMENT AND A COMMUNICATION METHOD OF A BASE STATION APPARATUS

(71) Applicants: Sharp Kabushiki Kaisha, Sakai (JP); FG Innovation Company Limited, Hong Kong (CN)

(72) Inventors: Kai Ying, Vancouver, WA (US); Tatsushi Aiba, Osaka (JP); John Michael Kowalski, Vancouver, WA (US)

(73) Assignees: Sharp Kabushiki Kaisha, Osaka (JP); Sharp Corporation, Osaka (JP)

( * ) Notice: Subject to any disclaimer, the term of this patent is extended or adjusted under 35 U.S.C. 154(b) by 0 days.

(21) Appl. No.: 17/461,653

(22) Filed: Aug. 30, 2021

(65) Prior Publication Data
US 2021/0392630 A1 Dec. 16, 2021

Related U.S. Application Data

(63) Continuation of application No. 16/267,773, filed on Feb. 5, 2019, now Pat. No. 11,109,368, which is a continuation of application No. PCT/US2019/016496, filed on Feb. 4, 2019.

(60) Provisional application No. 62/630,043, filed on Feb. 13, 2018.

(51) Int. Cl.
*H04W 72/04* (2009.01)
*H04W 76/27* (2018.01)
(Continued)

(52) U.S. Cl.
CPC ............. *H04W 72/042* (2013.01); *H04L 5/00* (2013.01); *H04W 72/0406* (2013.01);
(Continued)

(58) Field of Classification Search
None
See application file for complete search history.

(56) References Cited

U.S. PATENT DOCUMENTS

2014/0307560 A1 10/2014 Kim et al.
2016/0044665 A1 2/2016 Novlan et al.
(Continued)

FOREIGN PATENT DOCUMENTS

CN 102143593 B 8/2011

OTHER PUBLICATIONS

"RAN1 Chairman's Notes," 3GPP TSG RAN WG1 Meeting AH 1801, Vancouver, Canada, Jan. 26, 2018.
(Continued)

*Primary Examiner* — Otis L Thompson, Jr.
(74) *Attorney, Agent, or Firm* — Austin Rapp

(57) ABSTRACT

A user equipment (UE) is described. The UE includes receiving circuitry configured to receive system information comprising first information of first time domain resource assignment for a physical downlink shared channel (PDSCH). The receiving circuitry is also configured to receive a UE-specific radio resource control (RRC) signal comprising second information of second time domain resource assignment for a PDSCH. The receiving circuitry is also configured to perform, based on a detection of a physical downlink control channel (PDCCH), the PDSCH reception according to either the first information of the first time domain resource assignment or the second information of the second time domain resource assignment.

13 Claims, 28 Drawing Sheets

(51) Int. Cl.
  *H04L 5/00* (2006.01)
  *H04W 72/0446* (2023.01)
  *H04W 72/1273* (2023.01)
  *H04L 69/324* (2022.01)

(52) U.S. Cl.
  CPC ... *H04W 72/0446* (2013.01); *H04W 72/1273* (2013.01); *H04W 76/27* (2018.02); *H04L 69/324* (2013.01)

(56) References Cited

U.S. PATENT DOCUMENTS

| | | | |
|---|---|---|---|
| 2017/0353255 | A1 | 12/2017 | Islam et al. |
| 2018/0227156 | A1 | 8/2018 | Papasakellariou |
| 2019/0045525 | A1 | 2/2019 | Shi et al. |
| 2019/0082403 | A1 | 3/2019 | Lee et al. |
| 2019/0123879 | A1 | 4/2019 | Wang et al. |
| 2019/0149365 | A1 | 5/2019 | Chatterjee et al. |
| 2019/0222284 | A1 | 7/2019 | Huang |
| 2019/0223084 | A1* | 7/2019 | John Wilson ......... H04W 76/11 |
| 2019/0349904 | A1 | 11/2019 | Kwak et al. |
| 2020/0120642 | A1* | 4/2020 | Hwang ................. H04L 5/0048 |
| 2020/0120680 | A1* | 4/2020 | Hwang ............. H04W 72/0493 |
| 2020/0128542 | A1 | 4/2020 | Tang et al. |
| 2020/0275431 | A1* | 8/2020 | Bae ....................... H04L 5/1469 |
| 2021/0067300 | A1 | 3/2021 | Pan et al. |
| 2022/0263608 | A1* | 8/2022 | Wei ....................... H04L 1/1812 |

OTHER PUBLICATIONS

3GPP TR 22.862 V1.0.0, Feasibility Study on New Services and Markets Technology Enablers Critical Communications; Stage 1 (Release 14), Feb. 2016.
3GPP TR 38.913 V0.3.0, Study on Scenarios and Requirements for Next Generation Access Technologies (Release 14), Mar. 2016.
3GPP TS 38.211 V15.0.0, 3rd Generation Partnership Project; Technical Specification Group Radio Access Network; NR; Physical channels and modulation (Release 15), Dec. 2017.
3GPP TS 38.212 V15.0.0, 3rd Generation Partnership Project; Technical Specification Group Radio Access Network; NR; Multiplexing and channel coding (Release 15), Dec. 2017.
3GPP TS 38.213, V15.0.0, 3rd Generation Partnership Project; Technical Specification Group Radio Access Network; NR; Physical layer procedures for control (Release 15), Dec. 2017.
3GPP TS 38.214 V15.0.0, 3rd Generation Partnership Project; Technical Specification Group Radio Access Network; NR; Physical layer procedures for data (Release 15), Dec. 2017.
Ericsson, "Text proposal on 38.331", 3GPP TSG RAN WG1 Meeting AH 1801, Vancouver, Canada, R1-1801095, Jan. 26, 2018.
Huawei, HiSilicon, "Overview of URLLC support in NR", 3GPP TSG RAN WG1 meeting #86bis, Lisbon, Portugal, R1-1608843, Oct. 14, 2016.
International Search Report and Written Opinion issued for PCT Application No. PCT/US2019/016496 dated May 6, 2019.
Notice of Allowance issued for U.S. Appl. No. 16/267,773 dated Apr. 27, 2021.
NTT DOCOMO, Inc., "Offline summary for AI 7.3.3.4 UL data transmission procedure", 3GPP TSG RAN WG1 meeting #91, Reno, USA, R1-1721454, Dec. 1, 2017.
Office Action issued for U.S. Appl. No. 16/267,773 dated Oct. 16, 2020.
Office Action issued for U.S. Appl. No. 16/267,773 dated Feb. 17, 2021.
Intel Corporation, "UE behaviour for SPS PDSCH in subframe configured for EPDCCH", 3GPP TSG-RAN WG1 #71, New Orleans, USA, R1-124726, Nov. 16, 2012.
Samsung, "Corrections on HARQ Feedback", 3GPP TSG RAN WG1 #AH 1801, Vancouver, Canada, R1-1800453, Jan. 26, 2018.
Samsung, "EPDCCH Starting Subframe Symbol", 3GPP TSG RAN WG1 #70bis, San Diego, USA, R1-124379, Oct. 12, 2012.

\* cited by examiner

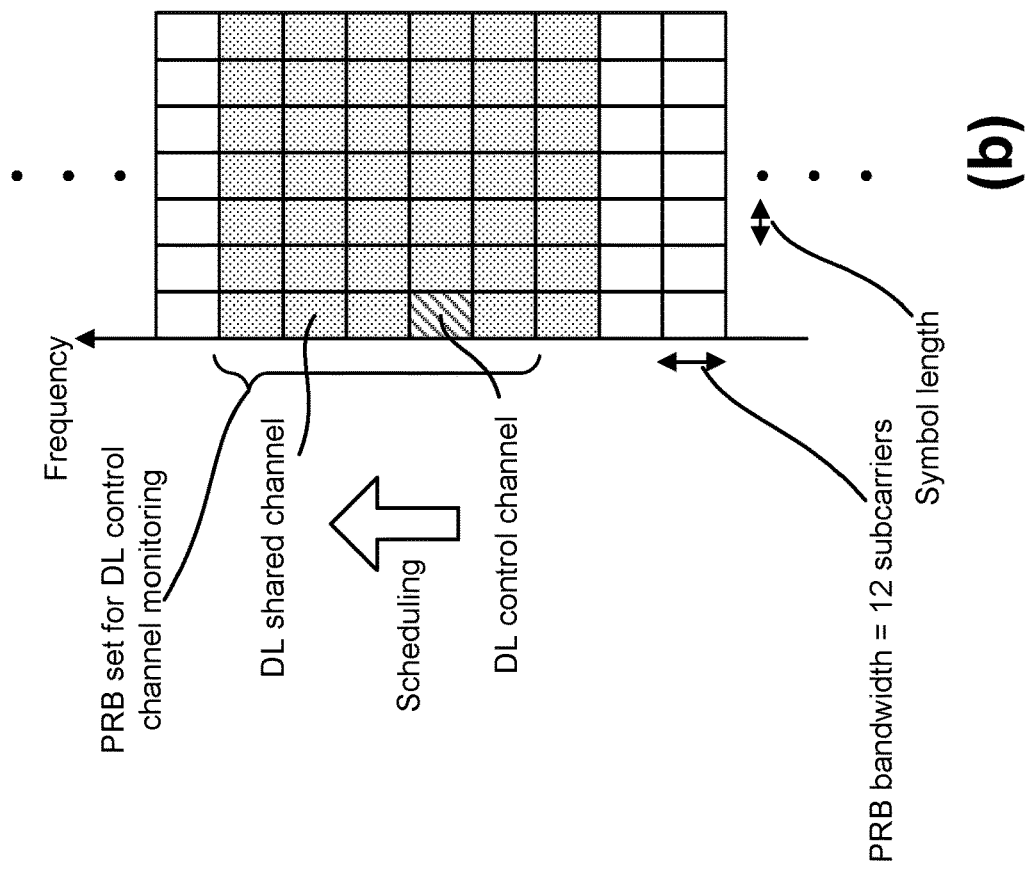
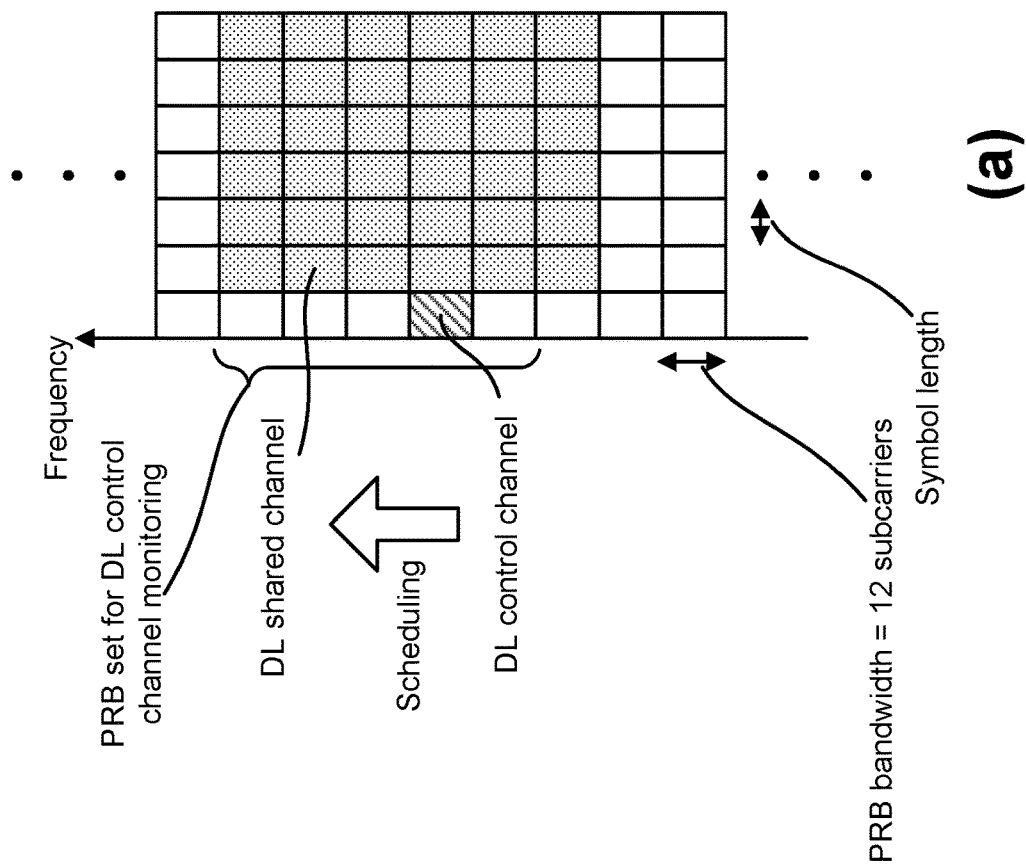
FIG. 18

USER EQUIPMENT, A BASE STATION APPARATUS, A COMMUNICATION METHOD OF A USER EQUIPMENT AND A COMMUNICATION METHOD OF A BASE STATION APPARATUS

RELATED APPLICATIONS

This application is a continuation of U.S. patent application Ser. No. 16/267,773, entitled "USER EQUIPMENTS, BASE STATIONS AND METHODS FOR DOWNLINK SEMI-PERSISTENT SCHEDULING," filed on Feb. 5, 2019, which is a continuation of PCT/US2019/016496, entitled "USER EQUIPMENTS, BASE STATIONS AND METHODS FOR DOWNLINK SEMI-PERSISTENT SCHEDULING," filed on Feb. 4, 2019, and which is related to and claims priority from U.S. Provisional Patent Application No. 62/630,043, entitled "USER EQUIPMENTS, BASE STATIONS AND METHODS FOR DOWNLINK SEMI-PERSISTENT SCHEDULING," filed on Feb. 13, 2018, which are all hereby incorporated by reference herein, in their entirety.

TECHNICAL FIELD

The present disclosure relates generally to communication systems. More specifically, the present disclosure relates to user equipments, base stations and methods for downlink semi-persistent scheduling.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 18 shows examples of DL control channel monitoring regions;

DETAILED DESCRIPTION

Figure 1:
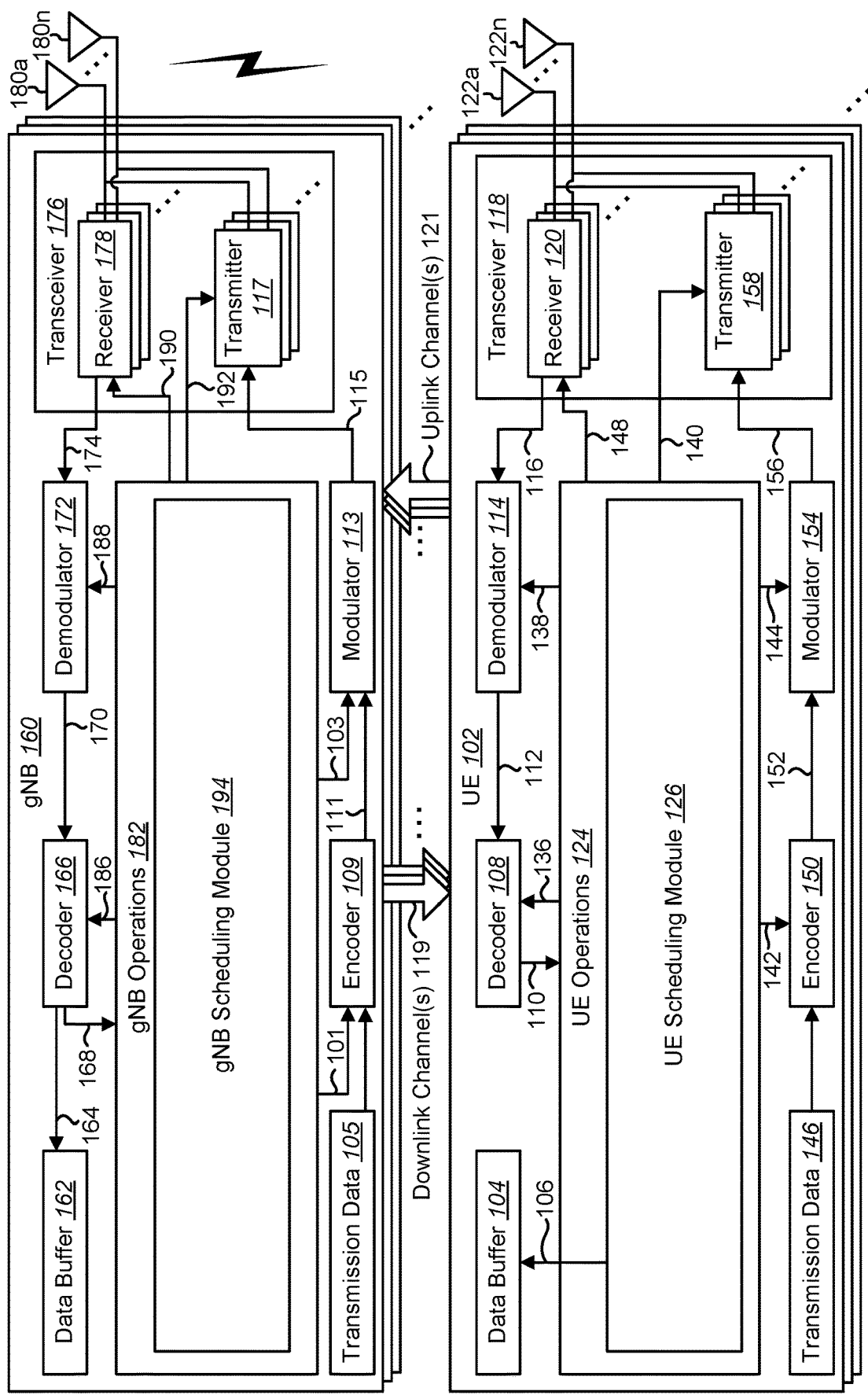
FIG. 1 is a block diagram illustrating one implementation of one or more gNBs and one or more UEs in which systems and methods for downlink semi-persistent scheduling may be implemented.

A user equipment (UE) is described. The UE includes receiving circuitry configured to receive system information comprising first information of first time domain resource assignment for a physical downlink shared channel (PDSCH). The receiving circuitry is configured to receive a UE-specific radio resource control (RRC) signal comprising second information of second time domain resource assignment for a PDSCH. The receiving circuitry is also configured to perform, based on a detection of a physical downlink control channel (PDCCH), the PDSCH reception according to either the first information of the first time domain resource assignment or the second information of the second time domain resource assignment. In a case that the first information of the first time domain resource assignment is configured and the second information of the second time domain resource assignment is configured, the second information of the second time domain resource assignment may override the first information of the first time domain resource assignment, and the second information of the second time domain resource assignment may be used for the PDSCH reception.

In a case that the first information of the first time domain resource assignment is configured and the second information of the second time domain resource assignment is not configured, the first information of the first time domain resource assignment may be used for the PDSCH reception. In a case that the second information of the second time domain resource assignment is configured, the second information of the second time domain resource assignment may be used for the PDSCH reception.

The system information may be remaining minimum system information. The PDCCH may be used for receiving downlink control information with cyclic redundancy check (CRC) scrambled by a configured scheduling radio network temporary identifier (CS-RNTI).

The first information of the first time domain resource assignment my comprise a first set of timing information for the PDSCH reception. The second information of the second time domain resource assignment may comprise a second set of timing information for the PDSCH reception. In a case that the first information of the first time domain resource assignment is used for the PDSCH reception, the PDCCH may be used for indicating one timing information among the first set. In a case that the first information of the first time domain resource assignment is used for the PDSCH reception, the PDCCH may be used for indicating one timing information among the second set.

A base station apparatus is also described. The base station includes transmitting circuitry configured to transmit system information comprising first information of first time domain resource assignment for a physical downlink shared channel (PDSCH). The transmitting circuitry is configured to transmit a UE-specific radio resource control (RRC) signal comprising second information of second time domain resource assignment for a PDSCH. The transmitting circuitry is configured to perform, based on a transmission of a physical downlink control channel (PDCCH), the PDSCH transmission according to either the first information of the first time domain resource assignment or the second information of the second time domain resource assignment. In a case that the first information of the first time domain resource assignment is configured and the second information of the second time domain resource assignment is configured, the second information of the second time domain resource assignment overrides the first information of the first time domain resource assignment, and the second information of the second time domain resource assignment is used for the PDSCH transmission.

In a case that the first information of the first time domain resource assignment is configured and the second information of the second time domain resource assignment is not configured, the first information of the first time domain resource assignment may be used for the PDSCH transmission. In a case that the second information of the second time domain resource assignment is configured, the second information of the second time domain resource assignment may be used for the PDSCH transmission.

The system information may be remaining minimum system information. The PDCCH may be used for transmitting downlink control information with cyclic redundancy check (CRC) scrambled by a configured scheduling radio network temporary identifier (CS-RNTI).

The first information of the first time domain resource assignment may comprise a first set of timing information for the PDSCH transmission. The second information of the second time domain resource assignment may comprise a second set of timing information for the PDSCH transmission. In a case that the first information of the first time domain resource assignment is used for the PDSCH transmission, the PDCCH may be used for indicating one timing information among the first set. In a case that the first information of the first time domain resource assignment is used for the PDSCH transmission, the PDCCH may be used for indicating one timing information among the second set.

A communication method of a user equipment is also described. The communication method includes receiving system information comprising first information of first time domain resource assignment for a physical downlink shared channel (PDSCH). The communication method also includes receiving a UE-specific radio resource control (RRC) signal comprising second information of second time domain resource assignment for a PDSCH. The communication method also includes performing, based on a detection of a physical downlink control channel (PDCCH), the PDSCH reception according to either the first information of the first time domain resource assignment or the second information of the second time domain resource assignment. In a case that the first information of the first time domain resource assignment is configured and the second information of the second time domain resource assignment is configured, the second information of the second time domain resource assignment overrides the first information of the first time domain resource assignment, and the second information of the second time domain resource assignment is used for the PDSCH reception.

In a case that the first information of the first time domain resource assignment is configured and the second information of the second time domain resource assignment is not configured, the first information of the first time domain resource assignment may be used for the PDSCH reception. In a case that the second information of the second time domain resource assignment is configured, the second information of the second time domain resource assignment may be used for the PDSCH reception.

The first information of the first time domain resource assignment may comprise a first set of timing information for the PDSCH reception. The second information of the second time domain resource assignment may comprise a second set of timing information for the PDSCH reception. In a case that the first information of the first time domain resource assignment is used for the PDSCH reception, the PDCCH may be used for indicating one timing information among the first set. In a case that the first information of the first time domain resource assignment is used for the PDSCH reception, the PDCCH may be used for indicating one timing information among the second set.

A communication method of a base station apparatus is also described. The communication method includes transmitting system information comprising first information of first time domain resource assignment for a physical downlink shared channel (PDSCH). The communication method also includes transmitting a UE-specific radio resource control (RRC) signal comprising second information of second time domain resource assignment for a PDSCH. The communication method also includes performing, based on a transmission of a physical downlink control channel (PDCCH), the PDSCH transmission according to either the first information of the first time domain resource assignment or the second information of the second time domain resource assignment. In a case that the first information of the first time domain resource assignment is configured and the second information of the second time domain resource assignment is configured, the second information of the second time domain resource assignment overrides the first information of the first time domain resource assignment, and the second information of the second time domain resource assignment is used for the PDSCH transmission.

In a case that the first information of the first time domain resource assignment is configured and the second information of the second time domain resource assignment is not configured, the first information of the first time domain resource assignment may be used for the PDSCH transmission. In a case that the second information of the second time domain resource assignment is configured, the second information of the second time domain resource assignment may be used for the PDSCH transmission.

The first information of the first time domain resource assignment may comprise a first set of timing information for the PDSCH transmission. The second information of the second time domain resource assignment may comprise a second set of timing information for the PDSCH transmission. In a case that the first information of the first time domain resource assignment is used for the PDSCH transmission, the PDCCH may be used for indicating one timing information among the first set. In a case that the first information of the first time domain resource assignment is used for the PDSCH transmission, the PDCCH may be used for indicating one timing information among the second set.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

Some configurations of the systems and methods described herein teach approaches for URLLC transmission/retransmission management to meet the latency/reliability requirement. Some requirements for URLLC relate to user (U)-plane latency and reliability. For URLLC, the target user plane latency is 0.5 milliseconds (ms) each way for both UL and DL. The target reliability is $1-10^{-5}$ for X bytes within 1 milliseconds (ms).

These URLLC-specific constraints make the hybrid automatic repeat request (HARD) and retransmission mechanism design difficult. For example, the receiver must reply with a quick acknowledgement (ACK) or negative acknowledgement (NACK) or an uplink grant to meet the latency requirement, or the transmitter can retransmit immediately without waiting for ACK/NACK to enhance the reliability. On the other, grant-based or grant-free repetitions are supported to further enhance the reliability. How to terminate the repetitions is also an important issue. The described systems and methods teach URLLC HARQ/retransmission design in different cases.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for downlink semi-persistent scheduling may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNB s 160. The UE operations module 124 may include a UE scheduling module 126.

The UE scheduling module 126 may perform downlink (DL) semi-persistent scheduling (SPS). DL SPS with or without repetitions is described herein. Furthermore, a hybrid automatic repeat request (HARD) mechanism design for the DL SPS is also described herein.

In a first aspect, for DL SPS in new radio (NR), there may be several basic procedures: radio resource control (RRC) configuration (e.g., a RRC message, a RRC signal), activation, DL transmission and deactivation, which are described in connection with FIG. 2. An example for DL SPS RRC configuration is shown in Listing 1.

---

Listing-1

-- ASN1START
-- TAG-SPS-CONFIG-START
-- SPS may be configured on the PCell as well as on SCells. But it shall -continued Listing-1

```
not be configured for more than one serving cell of a cell group at once.
SPS-Config ::=              SEQUENCE {
    downlink                SEQUENCE {
    -- RNTI for DL SPS. Corresponds to L1 parameter 'SPS C-RNTI'
    sps-RNTI                RNTI-Value
    -- Periodicity for DL SPS
    -- Corresponds to L1 parameter 'semiPersistSchedIntervalDL'
    periodicity             ENUMERATED {ms10, ms20, ms32,
ms40, ms64, ms80, ms128, ms160, ms320, ms640,
                                        spare6, spare5, spare4,
spare3, spare2, spare1}    OPTIONAL,
    -- Number of configured HARQ processes for SPS DL.
    nrofHARQ-Processes      INTEGER (1..8)
    n1PUCCH-AN              CHOICE {
        format0             PUCCH-resource-config-PF0, --
        format1             PUCCH-resource-config-PF1 --
    }
 },
}
```

The physical downlink control channel (PDCCH) may be used to activate the DL SPS transmissions. The timing of the PDCCH (e.g., timing information in PDCCH) may indicate the start timing of DL SPS transmission (e.g., a value of K0). A gNB 160 may send the UE 102 a PDCCH scrambled by SPS C-RNTI at slot n-K0 to activate the DL SPS transmission. Here, the SPS C-RNTI described herein may be assumed to be CS-RNTI (Configured Scheduling RNTI) for sake of clear descriptions. Then the gNB 160 may start SPS PDSCH transmission at slot n. Namely, the UE 102 may receive the PDCCH used for activate the DL SPS transmission at slot n-K0. The value of K0 for DL SPS may be a fixed value (e.g., a default value, e.g., specified by the specification), configured by RRC and/or indicated by PDCCH (DCI) for activation. In a case that K0 timing field is not present or the timing field is 0-bit in DCI for activation, a different DCI field (e.g., HARQ process number, modulation and coding scheme, redundancy version, downlink assignment index, and/or new data indicator, etc.) can be used to indicate K0 (e.g., RV field set as '01' indicates K0=1). Namely, for the DCI format used to activate the DL SPS transmissions, one or more DCI fields (e.g., one or more predetermined fields) included in the DCI format may be used for indicating the timing information (e.g., the value of K0). In yet another example, Remaining Minimum System Information (RMSI) may be used for carrying (e.g., configuring) K0 timing information (e.g., the value of K0). Also, a dedicated RRC message may be used for carrying (e.g., configuring) K0 timing information (e.g., the value of K0). For example, in a case that K0 timing information is configured by using the dedicated RRC message, the K0 timing information configured by using the dedicated RRC message may be used. Namely, even if K0 timing information is configured by the RMSI, K0 timing information configured by using the dedicated RRC message may override K0 information configured by using the RMSI. Namely, in a case that no value of K0 timing information is configured by using the dedicated RRC message, K0 timing information configured by using the RMSI may be used. Also, in a case that no value of K0 timing information is configured by using the dedicated RRC message, the fixed value for K0 may be used. In yet another example, the first value in a configured set may be used for K0, or any predefined value may be used for K0.

The PDCCH for activation may include time domain resource assignment which may indicate a starting symbol and a length (e.g., the stating symbol in a lot and a length from the staring symbol). Here, the timing information described above may be the time domain resource assignment information. In a case that the time domain resource assignment field is not present or the time domain resource assignment field is 0-bit in DCI for activation, a different DCI field (e.g., HARQ process number, modulation and coding scheme, redundancy version, downlink assignment index, and/or new data indicator, etc.) can be used to indicate time domain resource assignment. Namely, for the DCI format used to activate the DL SPS transmissions, one or more DCI fields (e.g., one or more predetermined fields) may be used for indicating the time domain resource assignment information. In yet another example, Remaining Minimum System Information (RMSI) may be used for carrying the time domain resource assignment information. Also, a dedicated RRC message may be used for carrying (e.g., configuring) the time domain resource assignment information. For example, in a case that the time domain resource assignment information is configured by using the dedicated RRC message, the time domain resource assignment information configured by using the dedicated RRC message may be used. Namely, even if the time domain resource assignment information is configured by the RMSI, the time domain resource assignment information configured by using the dedicated RRC message may override the time domain resource assignment information configured by using the RMSI. Namely, in a case that no value of the time domain resource assignment information is configured by using the dedicated RRC message, the time domain resource assignment information configured by using the RMSI may be used. Also, in a case that no value of the time domain resource assignment information is configured by using the dedicated RRC message, the fixed value for the time domain resource assignment may be used. In yet another example, any predefined time domain resource assignment may be used.

Upon detection of a DL SPS PDSCH in slot n, the UE 102 may transmit HARQ-ACK in slot n+K1. The value of K1 for DL SPS may be a fixed value (e.g., a default value, e.g., specified by the specification), configured by RRC and/or indicated by PDCCH (DCI) for activation. In a case that K1 timing field is not present or the timing field is 0-bit in DCI for activation, a different DCI field (e.g., HARQ process number, modulation and coding scheme, redundancy version, downlink assignment index, and/or new data indicator, etc.) can be used to indicate K1 (e.g., RV field set as '11' indicates K1=4). Namely, for the DCI format used to activate the DL SPS transmissions, one or more DCI fields (e.g., one or more predetermined fields) included in the DCI format may be used for indicating the timing information (e.g., the value of K1). In yet another example, Remaining Minimum System Information (RMSI) may be used for carrying (e.g., configuring) K1 timing information (e.g., the value of K1). Also, a dedicated RRC message may be used for carrying (e.g., configuring) K1 timing information (e.g., the value of K1). For example, in a case that K1 timing information is configured by using the dedicated RRC message, the K1 timing information configured by using the dedicated RRC message may be used. Namely, even if K1 timing information is configured by the RMSI, K1 timing information configured by using the dedicated RRC message may override K1 information configured by using the RMSI. Namely, in a case that no value of K1 timing information is configured by using the dedicated RRC message, K1 timing information configured by using the RMSI may be used. Also, in a case that no value of K1 timing information is configured by using the dedicated RRC message, the fixed value for K1 may be used. In yet another example, a first value in a configured set may be used for K1, or any predefined value may be used for K1.

For the HARQ-ACK in slot n+K1, there may be a case where at least one semi-statically configured DL symbol overlaps with the symbol(s) carrying HARQ-ACK in slot n+K1, or a case where the symbol(s) carrying HARQ-ACK in slot n+K1 conflicts with (e.g., collides with) DL symbol(s) indicated by dynamic slot format indicator (SFI) (e.g., based on a slot format). Here, the one semi-statically configured DL symbol may be a DL symbols(s) determined based on the slot format configured by using system information (e.g., and/or the dedicated RRC message). Also, SFI may be included in DCI format with CRC (e.g., Cyclic Redundancy Check) scrambled by SFI-RNTI. Namely, the DCI format to which CRC parity bits scrambled by the SFI-RNTI are attached may be used for indicating the slot format (e.g., DL symbol(s), UL symbols(s) in a slot). Namely, for example, an UL slot n+K1 (e.g., and/or an UL symbol) in which HARQ-ACK for PDSCH transmission is transmitted may collide with a DL symbol(s) determined based on the slot format configured (e.g., indicated).

The UE 102 may use a backup value (K1_0) of timing for HARQ-ACK transmission for the PDSCH. The UE 102 may keep more than one values of timing for HARQ-ACK transmission for the PDSCH. One is the original or primary timing value, and other(s) are back up values. Namely, in a case that HARQ-ACK transmission for PDSCH in slot n+K1 collides with the DL symbol(s) (e.g., and/or the DL slot(s)) determined based on the slot format, the UE 102 may perform HARQ-ACK transmission for the PDSCH in slot n+K1_0. The value of K1_0 for DL SPS may be a fixed value (e.g., a default value, e.g., specified by the specification), configured by RRC and/or indicated by PDCCH (DCI) for activation. In a case that K1_0 timing field is not present or the timing field is 0-bit in DCI for activation, a different DCI field (e.g., HARQ process number, modulation and coding scheme, redundancy version, downlink assignment index, and/or new data indicator, etc.) can be used to indicate K1_0 (e.g., RV field set as '10' indicates K1_0=3). Namely, for the DCI format used to activate the DL SPS transmissions, one or more DCI fields (e.g., one or more predetermined fields) included in the DCI format may be used for indicating the timing information (e.g., the value of K1_0). In yet another example, Remaining Minimum System Information (RMSI) may be used for carrying (e.g., configuring) K1_0 timing information (e.g., the value of K0). Also, a dedicated RRC message may be used for carrying (e.g., configuring) K1_0 timing information (e.g., the value of K1_0). For example, in a case that K1_0 timing information is configured by using the dedicated RRC message, the K1_0 timing information configured by using the dedicated RRC message may be used. Namely, even if K1_0 timing information is configured by the RMSI, K1_0 timing information configured by using the dedicated RRC message may override K0 information configured by using the RMSI. Namely, in a case that no value of K1_0 timing information is configured by using the dedicated RRC message, K1_0 timing information configured by using the RMSI may be used. Also, in a case that no value of K1_0 timing information is configured by using the dedicated RRC message, the fixed value for K0 may be used. In yet another example, a second value in a configured set may be used for K1_0, or any predefined value may be used for K1_0.

In yet another design, the gNB 160 may indicate a dynamic change of K1. To avoid the HARQ-ACK conflict, the gNB 160 may indicate a new K1 by PDCCH (e.g., DCI, DL grant), or the gNB 160 may change the value of K1 through PDCCH (re)activation. For example, as described above, the DCI format with CRC scrambled by the CS-RNTI may be used for activating SPS PDSCH transmission. Namely, the DCI format to which CRC parity bits scrambled by the CS-RNTI are attached may be used for activating SPS PDSCH transmission. And, based on the detection of the DCI format with CRC scrambled by the CS-RNTI in a slot n, the UE 102 may transmit in a slot n+kl, HARQ-ACK for the SPS PDSCH transmission. Here, as described above, the value of K1 may be indicated by using the RRC message (e.g., the RMSI and/or the dedicated RRC message) and/or DCI included in the DCI format with CRC scrambled by the CS-RNTI. Here, the DCI format with CRC scrambled by the CS-RNTI may be used for indicating retransmission(s) of SPS PDSCH transmission. Namely, the CS-RNTI may be used for indicating SPS PDSCH activation and/or SPS PDSCH retransmission. Here, the DCI format with CRC scrambled by the CS-RNTI used for indicating SPS PDSCH retransmission may include K1 timing information (e.g., the value of K1). Namely, based on the detection of the DCI format with CRC scrambled by the CS-RNTI used for indicating SPS PDSCH retransmission, the UE 102 may change (e.g., switch, update, overwide) the value of K1 to transmit HARQ-ACK.

In yet another design, the UE 102 may drop the HARQ-ACK or NACK is assumed by the gNB 160. Then, the gNB 160 may retransmit to the UE 102.

When the UE 102 is configured with aggregation-factor-DL>1 (e.g., the number of PDSCH transmission (e.g., and/or PDSCH reception), and/or the number of slots for PDSCH transmission (e.g., and/or PDSCH reception)), the same symbol allocation may be applied across the aggregation-factor-DL consecutive slots not defined as UL by the slot format indication. The UE 102 may repeat PDSCH transmissions for the same TB in these aggregated slots. Namely, the UE 102 may perform PDSCH reception in a consecutive slots, based on the number determined from the aggregation-factor-DL. Namely, the number of PDSCH reception configured by using the aggregation-factor-DL may be the number of consecutive PDSCH reception. Also, the number of slots for PDSCH reception configured by using the aggregation-factor-DL may be the number of consecutive slots for PDSCH reception.

A RV sequence may be applied to the repetitions. A RV sequence may include a single value or multiple values. A RV sequence may be configured by RRC for DL repetitions. In yet another example, the RV sequence may be the same as UL transmission without grant or UL SPS. UL and DL may share the same RV sequence, or the RV sequence may be commonly configured for both UL and DL. The RV sequence may be separately configured for UL and DL. UL and DL may share the same set of RV sequences. UL and DL may use different sets of RV sequences. In yet another example, the RV sequence may be fixed or the same as the RV sequence determined by channel coding. The RV values in a RV sequence may be used cyclically if the number of repetitions is larger than the length of the RV sequence.

When DL repetition conflicts with (e.g., collide with) UL by the slot format indication, the UE 102 may skip the conflicted slot(s) and may continue to use the RV order from the next available aggregated slot. For example, the RV sequence is configured as {RV0, RV1, RV2, RV3} and the gNB 160 repeats PDSCH transmissions for the same TB in slot n, n+1, n+2 and n+3 with RV0, RV1, RV2 and RV3, respectively, if there is no SFI conflict. If slot n+3 is determined as UL by the slot format indication, then the UE 102 skips slot n+3 and repeat PDSCH transmission in slot n+4 by using RV3 if there is no SFI conflict in slot n+4.

In yet another design, the UE 102 may assume the RV value(s) in the RV sequence applied to the conflicted slot(s) although there is no PDSCH transmission. The DL PDSCH may be skipped but the RV counting in the RV sequence may be kept. Equivalently, the UE 102 may use the RV sequence corresponding to the slot index. For example, the RV sequence is configured as {RV0, RV1, RV2, RV3} and the gNB 160 repeats PDSCH transmissions for the same TB in slot n, n+1, n+2 and n+3 with RV0, RV1, RV2 and RV3, respectively, if there is no SFI conflict. If slot n+2 is determined as UL by the slot format indication, then the UE 102 skips slot n+2 and repeat PDSCH transmission in slot n+3 and n+4 by using RV3 and RV0, respectively, if there is no SFI conflict in slot n+3 or n+4.

Whether to resume the RV sequence after the conflict(s) or not may be configurable.

The UE 102 may transmit HARQ-ACK for each repetition. Namely, in a case that the aggregation-factor-DL (e.g., the aggregation-factor-DL>1) is configured, HARQ-ACK may be transmitted for each PDSCH reception. In yet another design, the UE 102 may transmit HARQ-ACK only for the last repetition. Namely, in a case that the aggregation-factor-DL (e.g., the aggregation-factor-DL>1) is configured, HARQ-ACK may be transmitted after the configured number (e.g., and/or the configured number of slots) of PDSCH reception is performed. Namely, for example, the UE 102 may transmit a positive acknowledgment (e.g., ACK) in a case that the configured number (e.g., and/or the configured number of slots) of PDSCH is received (e.g., in a case that the PDSCH reception based on the aggregation-factor-DL is terminated). Also, the UE 102 may transmit a negative acknowledgment (e.g., NACK) in a case that the configured number (e.g., and/or the configured number of slots) of PDSCH is not received. Whether to transmit HARQ-ACK for each repetition or the last repetition only may be configurable. Namely, the gNB 160 may transmit the RRC message, whether to transmit HARQ-ACK for each PDSCH reception or to transmit HARQ-ACK after the configured number (e.g., and/or the configured number of slots) of PDSCH reception is performed.

When the number of repetitions reaches the DL aggregation factor K, the gNB 160 may terminate the repetitions. When the gNB 160 receives ACK corresponding to a repetition, the gNB 160 may terminate the remaining repetitions for the same TB. In yet another example, the gNB 160 may keep transmitting the remaining repetitions.

The gNB 160 may transmit PDCCH (DCI, DL grant) to the UE 102 and terminate the repetitions or slot aggregations. The PDCCH may be used for scheduling the same TB or a new TB.

At the boundary of the period or at the beginning of the consecutive SPS time resource, if the gNB 160 does not finish K repetitions, it may stop the remaining repetitions.

For all the HARQ-ACK for repetitions, methods mentioned herein may be applied to handle the HARQ-ACK conflicts. In yet another design, HARQ-ACK for repetitions except the last one may be dropped when a conflict happens for these HARQ-ACK.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform downlink semi-persistent scheduling as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

Figure 2:
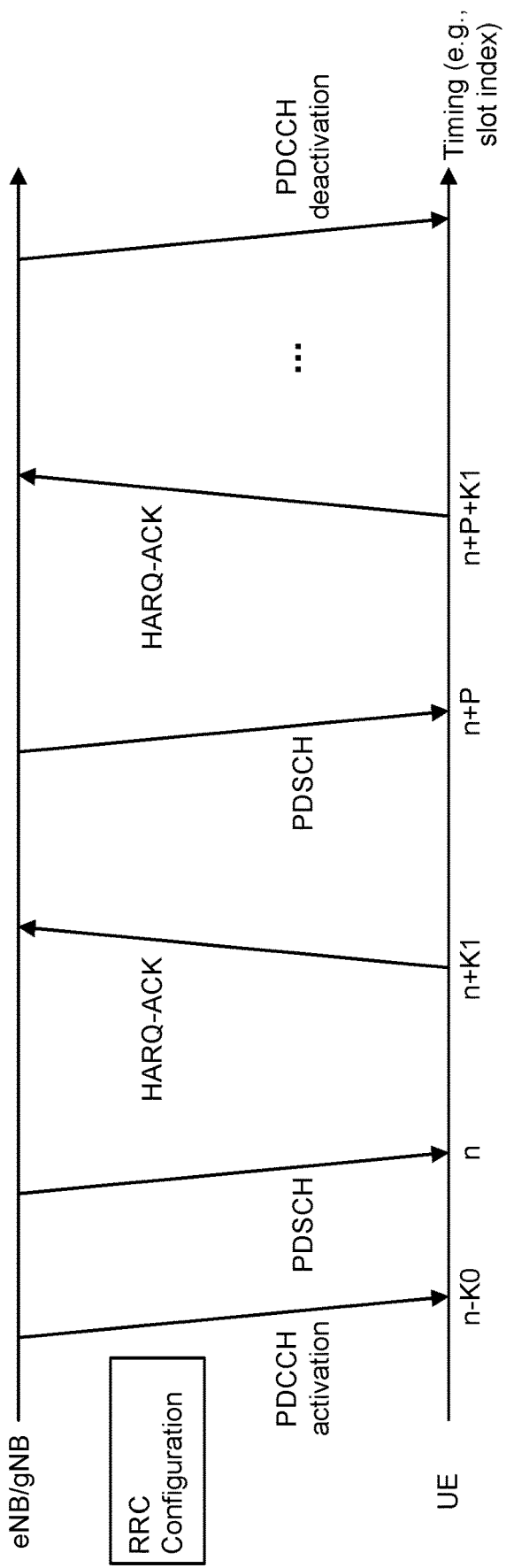
FIG. 2 is an example illustrating downlink (DL) semi-persistent scheduling (SPS) procedures.

FIG. 2 is an example illustrating downlink (DL) semi-persistent scheduling (SPS) procedures. For DL SPS, there may be several basic procedures: radio resource control (RRC) configuration (e.g., a RRC message, a RRC signal), activation, DL transmission and deactivation.

DL assignment to DL data timing (PDCCH activation to first SPS DL data) may be referred to as K0. After RRC configuration, the gNB 160 may send the UE 102 a PDCCH scrambled by SPS RNTI at slot n-K0 to activate the DL SPS transmission. Then the gNB 160 may start SPS PDSCH transmission at slot n. For example, the UE 102 may receive on the PDCCH in a slot n-K0, the DCI format with CRC scrambled by the CS-RNTI used for indicating DL SPS activation. Also, based on the detection, in a slot n-K0 of the DCI format with CRC scrambled by the CS-RNTI used for indicating DL SPS activation, the UE 102 perform reception of DL SPS in slot n. There may be several ways to indicate the value of K0.

In a first approach, the value of K0 may be configured by using the RRC message. For example, the gNB 160 may transmit, by using the RMSI and/or the dedicated RRC message, information used for configuring the value of K0.

In a second approach, the value of K0 may be indicated by PDCCH (DCI) for activation of DL SPS (e.g., the DCI format used for indicating DL SPS activation). In an implementation, the value of K0 may be indicated by DCI format 1_0 (e.g., referred to as fallback DCI) for activation of DL SPS. In another implementation, the value of K0 may be indicated by DCI format 1_1 (e.g., referred to as non-fallback DCI) for activation of DL SPS. If DCI format 1_0 and DCI format 1_1 are received for a DL SPS transmission, K0 included in DCI format 1_0 may be applied. Namely, the DCI format 1_0 may be used for indicating DL SPS activation. Also, the DCI format 1_1 may be used for indicating DL SPS activation. And, in a case that the DCI format 1_0 and the DCI format 1_1 are received for DL SPS reception (e.g., a single DL SPS reception), the UE 102 may use the value of K0 indicated by using the DCI format 1_0 to perform DL SPS reception. If DCI format 1_0 and DCI format 1_1 are received for a DL SPS transmission, K0 included in DCI format 1_1 may be applied. Namely, in a case that the DCI format 1_0 and the DCI format 1_1 are received for DL SPS reception (e.g., a single DL SPS reception), the UE 102 may use the value of K0 indicated by using the DCI format 1_1 to perform DL SPS reception. Also, for example, the UE 102 may not be expected to receive DCI format 1_0 and DCI format 1_1 for DL SPS transmission (e.g., the single DL SPS reception).

In a third approach, the RMSI may be used for carrying (e.g., configuring) K0 timing information (e.g., the value of K0). Here, the value of K0 carried by the RMSI may be used for DL SPS activated by using DCI format 1_0 (i.e., fallback DCI). Namely, in a case that the DCI format 1_0 used for indicating DL SPS activation is received, the UE 102 may use the value of K0 carried (e.g., configured) by using the RMSI to perform DL SPS reception. Here, for example, in a case that DCI format 1_1 used for indicating DL SPS activation is received, the UE 102 may use the value of K0 configured by using the dedicated RRC message to perform DL SPS reception. Also, in a case that DCI format 1_1 used for indicating DL SPS activation is received, the UE 102 may use the value of K0 indicated by using the DCI format 1_1 used for indicating DL SPS activation to perform DL SPS reception.

In a fourth approach, a set of values of K0 may be configured by the RRC message (e.g., the dedicated RRC message) and the choice (e.g., select) of K0 is indicated, among the set of values of K0, by PDCCH (DCI) for activation of DL SPS.

In a fifth approach, the value of K0 may be a fixed value or a default value (i.e., a predetermined value, e.g., specified by the specification). For example, in a case that the value of K0 is not explicitly indicated (e.g., by using the RRC message and/or by the PDCCH for activation of DL SPS), the default value (e.g., "0") is applied. The default value of K0 may be used for DL SPS activated by using DCI format 1_0 (i.e., fallback DCI). Namely, in a case that the DCI format 1_0 used for indicating DL SPS activation, the UE 102 may use the fixed value of K0 (e.g., the default value, e.g., "0") to perform DL SPS reception.

In a sixth approach, if K0 timing field is not present or the timing field is 0-bit in DCI for activation of DL SPS (e.g., the presence of the timing field K0 may be configured by RRC, the timing field K0 is present only in DCI format 1_1 (i.e., non-fallback DCI) for activation of DL SPS, the timing field K0 is not present in DCI format 1_0 (i.e., fall back DCI) for activation of DL SPS), then how to indicate K0 may be implemented in one or more of the following ways: re-interpretation of DCI field (e.g., a different DCI field can be used to indicate K0); RMSI may be used for carrying K0 timing information; the first value in a configured set is used, or any predefined value is used.

The timing for a given PDSCH to the DL ACK may be referred to as K1. After receiving a SPS PDSCH at slot n, the UE 102 may send HARQ feedback at slot n+K1. There may be several ways to indicate the value of K1. For example, the UE 102 may perform, in a slot n, the DL SPS reception (e.g., SPS PDSCH reception). And, based on the reception, in the slot n, of the SPS PDSCH, the UE 102 may perform, in a slot n+K1, HARQ-ACK transmission for the SPS PDSCH.

In a first approach, the value of K1 may be configured by using the RRC message. For example, the gNB 160 may transmit, by using the RMSI and/or the dedicated RRC message, information used for configuring the value of K1.

In a second approach, the value of K1 may be indicated by PDCCH (DCI) for activation of DL SPS (e.g., the DCI format used for indicating DL SPS activation). In an implementation, the value of K1 may be indicated by DCI format 1_0 (e.g., referred to as fallback DCI) for activation of DL SPS. In another implementation, the value of K1 may be indicated by DCI format 1_1 (e.g., referred to as non-fallback DCI) for activation of DL SPS. If DCI format 1_0 and DCI format 1_1 are received for a DL SPS transmission, K1 included in DCI format 1_0 may be applied. Namely, in a case that the DCI format 1_0 and the DCI format 1_1 are received for DL SPS reception (e.g., a single DL SPS reception), the UE 102 may use the value of K1 indicated by using the DCI format 1_0 to perform HARQ-ACK transmission. If DCI format 1_0 and DCI format 1_1 are received for a DL SPS transmission, K1 included in DCI format 1_1 may be applied. Namely, in a case that the DCI format 1_0 and the DCI format 1_1 are received for DL SPS reception (e.g., a single DL SPS reception), the UE 102 may use the value of K1 indicated by using the DCI format 1_1 to perform HARQ-ACK transmission. Also, the UE 102 may not be expected to receive DCI format 1_0 and DCI format 1_1 for DL SPS transmission (e.g., the single DL SPS reception).

In a third approach, the RMSI may be used for carrying (e.g., configuring) K1 timing information (e.g., the value of K1). Here, the value of K1 carried by the RMSI may be used for DL SPS activated by using DCI format 1_0 (i.e., fallback DCI). Namely, in a case that the DCI format 1_0 used for indicating DL SPS activation is received, the UE 102 may use the value of K1 carried (e.g., configured) by using the RMSI to perform HARQ-ACK transmission. Here, for example, in a case that DCI format 1_1 used for indicating DL SPS activation is received, the UE 102 may use the value of K1 configured by using the dedicated RRC message to perform HARQ-ACK transmission. Also, in a case that DCI format 1_1 used for indicating DL SPS activation is received, the UE 102 may use the value of K1 indicated by using the DCI format 1_1 used for indicating DL SPS activation to perform HARQ-ACK transmission.

In a fourth approach, a set of values of K1 may be configured by the RRC message (e.g., the dedicated RRC message) and the choice (e.g., select) of K1 is indicated, among the set of values of K1, by PDCCH (DCI) for activation.

In a fifth approach, the value of K1 may be a fixed value or a default value (i.e., a predetermined value, e.g., specified by the specification). For example, in a case that the value of K1 is not explicitly indicated (e.g., by using the RRC message and/or by the PDCCH for activation of DL SPS), the default value (e.g., "4") may be applied. The default value of K1 may be used for DL SPS activated by using DCI format 1_0 (i.e., fallback DCI). Namely, in a case that the DCI format 1_0 used for indicating DL SPS activation, the UE 102 may use the fixed value of K1 (e.g., the default value, e.g., "0") to perform HARQ-ACK transmission.

In a sixth approach, if K1 timing field is not present or the timing field is 0-bit in DCI for activation of DL SPS (e.g., the presence of the timing field K1 may be configured by RRC, the timing field K1 is present only in DCI format 1_1 (i.e., non-fallback DCI) for activation of DL SPS, the timing field K1 is not present in DCI format 1_0 (i.e., fall back DCI) for activation of DL SPS), then how to indicate K1 may be implemented in one or more of the following ways: re-interpretation of DCI field (e.g., a different DCI field may be used to indicate K1); RMSI may be used for carrying K1 timing information; a first value in a configured set is used, or any predefined value is used.

Periodicity for DL SPS may be referred to as P. In examples of this disclosure, the periodicity of DL SPS is in a unit of slot for simplicity, but the periodicity of DL SPS may also use other units such as symbol and milliseconds (ms). In current specifications, the minimum periodicity is 10 ms, but in the future version it may be less than 10 ms (e.g., 5 ms, 2 ms, 1 ms, 0.5 ms, 7 symbols, 2 symbols, etc.). Periodicity may determine the interval between two adjacent transmission occasions or initial transmissions or repetitions.

Figure 3:
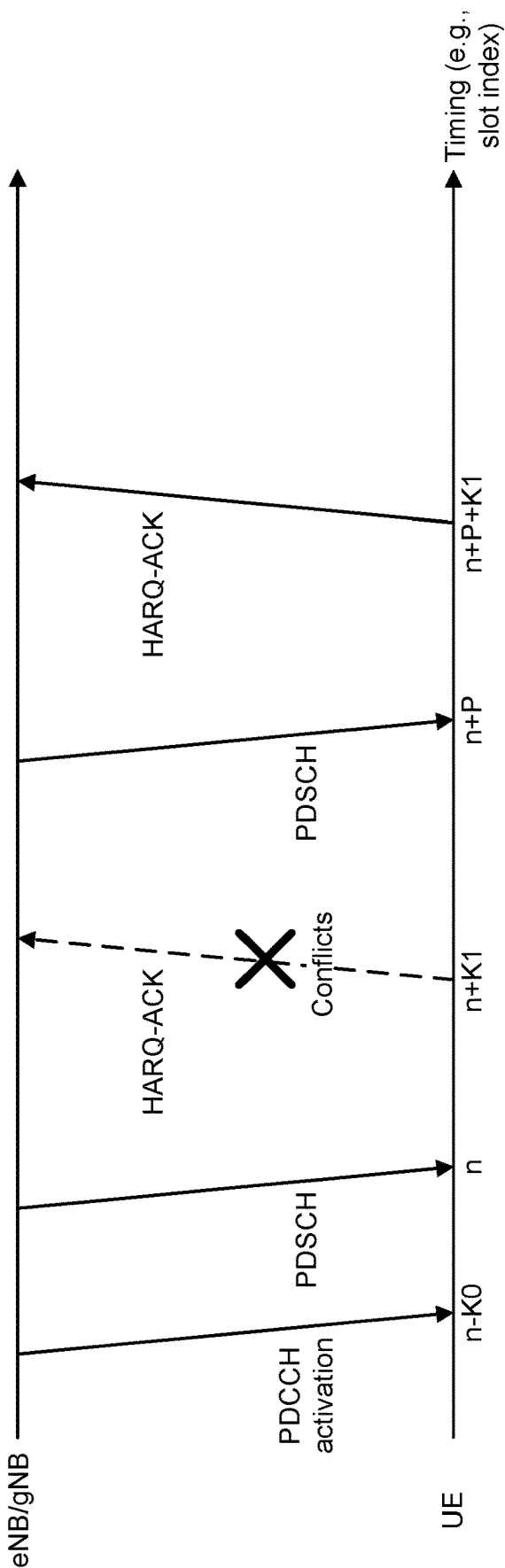
FIG. 3 is an example illustrating a DL SPS procedure for HARQ-ACK conflict.

FIG. 3 is an example illustrating a DL SPS procedure for HARQ-ACK conflict. As mentioned above, upon detection of a DL SPS PDSCH in slot n, UE is supposed to transmit HARQ-ACK in slot n+K1. However, there may be a case where at least one semi-statically configured DL symbol overlaps with the symbol(s) carrying HARQ-ACK in slot n+K1, or a case where the symbol(s) carrying HARQ-ACK in slot n+K1 conflicts with DL symbol(s) indicated by dynamic slot format indicator (SFI).

There may be several ways to handle the HARQ-ACK in cases of conflict. In an approach to handle HARQ-ACK conflict, the UE 102 may use a backup value (K1_0) of timing for given PDSCH to the DL ACK. The UE 102 may keep two or more values of timing for a given PDSCH to the DL ACK. One is the original or primary timing value, and other(s) are back up values. If HARQ-ACK conflict happens in slot n+K1, the UE 102 may try to HARQ-ACK in slot n+K1_0. There may several ways to indicate the backup value K1_0.

In a first approach, the value of K1_0 may be configured by using the RRC message. For example, the gNB 160 may transmit, by using the RMSI and/or the dedicated RRC message, information used for configuring the value of K0.

In a second approach, the value of K1_0 may be indicated by PDCCH (DCI) for activation of DL SPS (e.g., the DCI format used for indicating DL SPS activation). Here, the value of K1_0 may be indicated by DCI format 1_0 (e.g., referred to as fallback DCI) for activation of DL SPS. Also, the value of K1_0 may be indicated by DCI format 1_1 (e.g., referred to as non-fallback DCI) for activation of DL SPS. If DCI format 1_0 and DCI format 1_1 are received for a DL SPS transmission, K1_0 included in DCI format 1_0 may be applied. Namely, the DCI format 1_0 may be used for indicating DL SPS activation. Also, the DCI format 1_1 may be used for indicating DL SPS activation. And, in a case that the DCI format 1_0 and the DCI format 1_1 are received for DL SPS reception (e.g., a single DL SPS reception), the UE 102 may use the value of K1_0 indicated by using the DCI format 1_0 to perform HARQ-ACK transmission. If DCI format 1_0 and DCI format 1_1 are received for a DL SPS transmission, K1_0 included in DCI format 1_1 may be applied. Namely, in a case that the DCI format 1_0 and the DCI format 1_1 are received for DL SPS reception (e.g., a single DL SPS reception), the UE 102 may use the value of K1_0 indicated by using the DCI format 1_1 to perform HARQ-ACK transmission. Also, for example, the UE 102 may not be expected to receive DCI format 1_0 and DCI format 1_1 for DL SPS transmission (e.g., the single SL SPS transmission).

In a third approach, the RMSI may be used for carrying (e.g., configuring) K1_0 timing information (e.g., the value of K1_0). Here, the value of K1_0 carried by the RMSI may be used for DL SPS activated by using DCI format 1_0 (i.e., fallback DCI). Namely, in a case that the DCI format 1_0 used for indicating DL SPS activation is received, the UE 102 may use the value of K1_0 carried (e.g., configured) by using the RMSI to perform HARQ_ACK transmission. Here, for example, in a case that DCI format 1_1 used for indicating DL SPS activation is received, the UE 102 may use the value of K1_0 configured by using the dedicated RRC message to perform HARQ-ACK transmission. Also, in a case that DCI format 1_1 used for indicating DL SPS activation is received, the UE 102 may use the value of K1_0 indicated by using the DCI format 1_1 used for indicating DL SPS activation to perform HARQ-ACK transmission.

In a fourth approach, a set of values of K1_0 may be configured by the RRC message and the choice (e.g., select) of K1_0 may be indicated, among the set of values of K1_0, by PDCCH (DCI) for activation of DL SPS.

In a fifth approach, the value of K1_0 may be a fixed value or a default value (i.e., a predetermined value, e.g. specified by specification). For example, in a case that the value of K1_0 is not explicitly indicated (e.g., by using the RRC message and/or by the PDCCH for indicating DL SPS activation), the default value (e.g., "4") may be applied. The default value of K1_0 may be used for DL SPS activated by using DCI format 1_0 (i.e., fallback DCI). Namely, in a case that the DCI format 1_0 used for indicating DL SPS activation, the UE 102 may use the fixed value of K1_0 (e.g., the default value, e.g., "4") to perform HARQ-ACK transmission.

In a sixth approach, if K1_0 timing field is not present or the timing field is 0-bit in DCI for activation of DL SPS (e.g., the presence of the timing field K1_0 may be configured by RRC, the timing field K1_0 is present only in DCI format 1_1 (i.e., non-fallback DCI) for activation of DL SPS, the timing field K1_0 is not present in DCI format 1_0 (i.e., fall back DCI) for activation of DL SPS), then how to indicate K1_0 may be implemented in one or more of the following ways: re-interpretation of DCI field (e.g., a different DCI field can be used to indicate K1_0); RMSI may be used for carrying K1_0 timing information; a second value in a configured set may be used, or any predefined value may be used.

In another approach to handle HARQ-ACK conflict, the gNB 160 indicates a dynamic change of K1. To avoid the HARQ-ACK conflict, the gNB 160 may indicate a new K1 (e.g., the value of K1_1) by PDCCH (DCI, DL grant), or the gNB 160 may change the value of K1 through PDCCH (re)activation.

In a first approach, the value of K1_1 may be configured by using the RRC message. For example, the gNB 160 may transmit, by using the RMSI and/or the dedicated RRC message, information used for configuring the value of K1_1.

In a second approach, the value of K1_1 may be indicated by PDCCH (DCI) for indicating DL SPS retransmission (e.g., the DCI format used for indicating DL SPS retransmission). In an implementation, the value of K1_1 may be indicated by DCI format 1_0 (e.g., referred to as fallback DCI) for DL SPS retransmission. In another implementation, the value of K1_1 may be indicated by DCI format 1_1 (e.g., referred to as non-fallback DCI) for DL SPS retransmission. Namely, the DCI format 1_0 may be used for indicating DL SPS activation and/or DL SPS retransmission. Also, the DCI format 1_1 may be used for indicating DL SPS activation and/or DL SPS retransmission. And, in a case that the DCI format 1_0 and the DCI format 1_1 are received for DL SPS reception (e.g., a single DL SPS reception), the UE 102 may use the value of K1_1 indicated by using the DCI format 1_0 to perform HARQ-ACK transmission. If DCI format 1_0 and DCI format 1_1 are received for a DL SPS transmission, K1_1 included in DCI format 1_1 may be applied. Namely, in a case that the DCI format 1_0 and the DCI format 1_1 are received for DL SPS reception (e.g., a single DL SPS reception), the UE 102 may use the value of K1_1 indicated by using the DCI format 1_1 to perform HARQ-ACK transmission. Also, for example, the UE 102 may not be expected to receive DCI format 1_0 and DCI format 1_1 for DL SPS transmission (e.g., the single DL SPS reception).

In a third approach, the RMSI may be used for carrying (e.g., configuring) K1_1 timing information (e.g., the value of K1_1). Here, the value of K1_1 carried by the RMSI may be used for DL SPS activated and/or retransmitted by using DCI format 1_0 (i.e., fallback DCI). Namely, in a case that the DCI format 1_0 used for indicating DL SPS activation and/or DL SPS retransmission is received, the UE 102 may use the value of K1_1 carried (e.g., configured) by using the RMSI to perform HARQ-ACK transmission. Here, for example, in a case that DCI format 1_1 used for indicating DL SPS activation and/or DL SPS retransmission is received, the UE 102 may use the value of K1_1 configured by using the dedicated RRC message to perform HARQ-ACK transmission. Also, in a case that DCI format 1_1 used for indicating DL SPS activation and/or DL SPS retransmission is received, the UE 102 may use the value of K1_1 indicated by using the DCI format 1_1 used for indicating DL SPS activation and/or DL SPS retransmission to perform HARQ-ACK transmission.

In a fourth approach, a set of values of K1_1 may be configured by the RRC message (e.g., the dedicated RRC message) and the choice (e.g., select) of K1_1 is indicated, among the set of values of K0, by PDCCH (DCI) for activation of DL SPS.

In a fifth approach, the value of K1_1 may be a fixed value or a default value (i.e., a predetermined value, e.g., specified by the specification). For example, in a case that the value of K1_1 is not explicitly indicated (e.g., by using the RRC message and/or by the PDCCH for activation of DL SPS), the default value (e.g., "0") is applied. The default value of K1_1 may be used for DL SPS activated and/or retransmitted by using DCI format 1_0 (i.e., fallback DCI). Namely, in a case that the DCI format 1_0 used for indicating DL SPS activation and/or DL SPS retransmission, the UE 102 may use the fixed value of K1_1 (e.g., the default value, e.g., "4") to perform HARQ-ACK transmission.

In a sixth approach, if K1_1 timing field is not present or the timing field is 0-bit in DCI for activation of DL SPS (e.g., the presence of the timing field K1_1 may be configured by RRC, the timing field K1_1 is present only in DCI format 1_1 (i.e., non-fallback DCI) for activation of DL SPS, the timing field K1_1 is not present in DCI format 1_0 (i.e., fall back DCI) for activation of DL SPS), then how to indicate K1_1 may be implemented in one or more of the following ways: re-interpretation of DCI field (e.g., a different DCI field can be used to indicate K1_1); RMSI may be used for carrying K0 timing information; the first value in a configured set is used, or any predefined value is used.

In yet another approach to handle HARQ-ACK conflict, the UE 102 may drop the HARQ-ACK or NACK is assumed by the gNB 160. In this case, the gNB 160 may retransmit to the UE 102.

Figure 4:
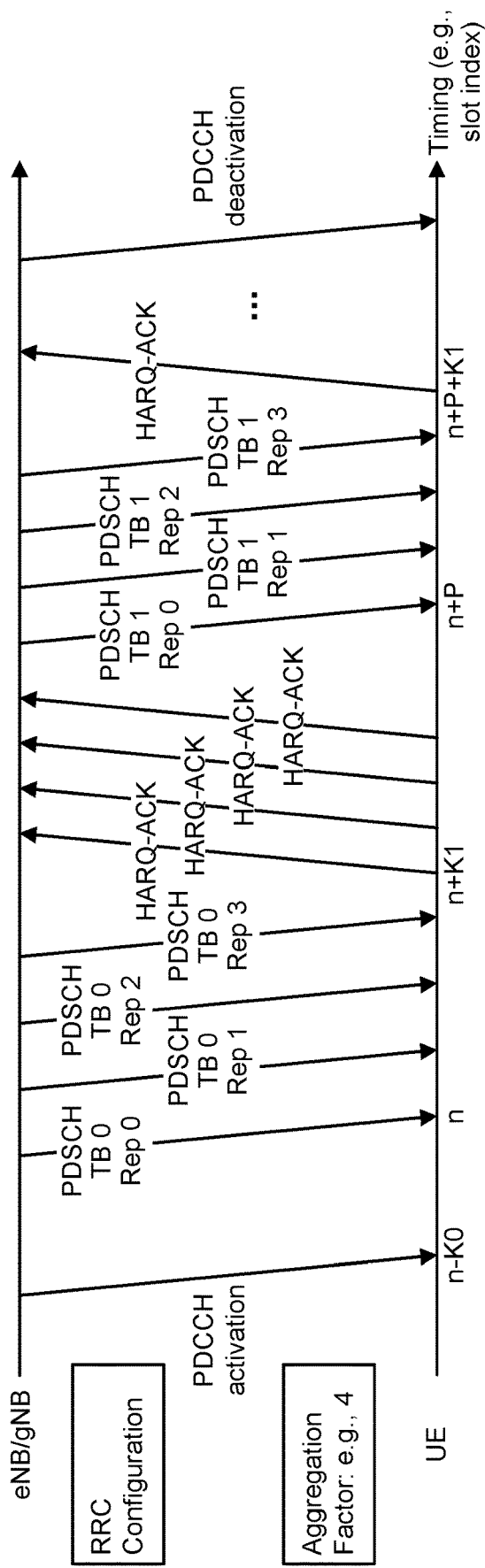
FIG. 4 is an example illustrating a DL SPS procedure for repetitions and DL slot aggregation.

FIG. 4 is an example illustrating a DL SPS procedure for repetitions and DL slot aggregation. When the UE 102 is configured with DL slot aggregation factor K which is greater than 1, the same symbol allocation may be applied across the K consecutive slots not defined as UL by the slot format indication and the UE 102 may repeat PDSCH transmissions for the same TB.

For the case of repetitions or slot aggregations, the following issues should be addressed. One issue is Redundancy version (RV). A RV sequence may be applied to the repetitions. A RV sequence may include a single value or multiple values. There may be several ways to configure the RV sequence.

In one approach, an RV sequence may be configured by RRC for DL repetitions (slot aggregation). In another approach, the RV sequence is same as UL transmission without grant or UL SPS. In this approach, UL and DL share the same RV sequence. In yet another approach, the RV sequence is fixed or the same as the RV sequence determined by channel coding.

Figure 5:
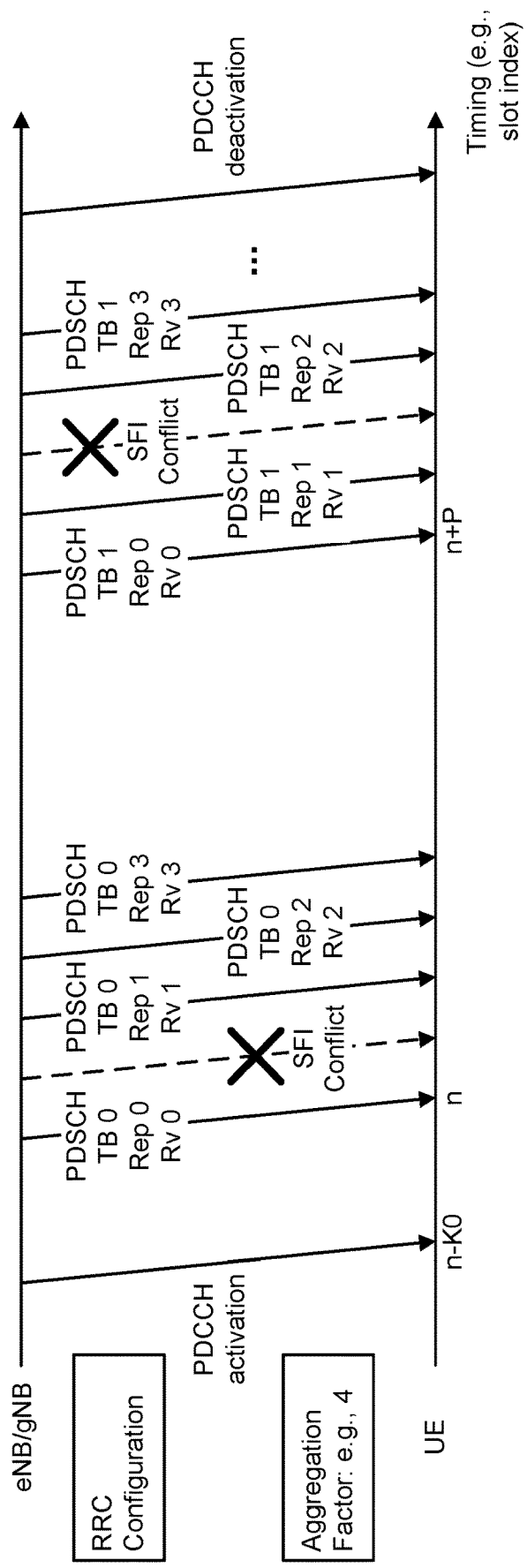
FIG. 5 is an example illustrating an approach for RV determination when DL repetition conflicts with UL by the slot format indication.
Figure 6:
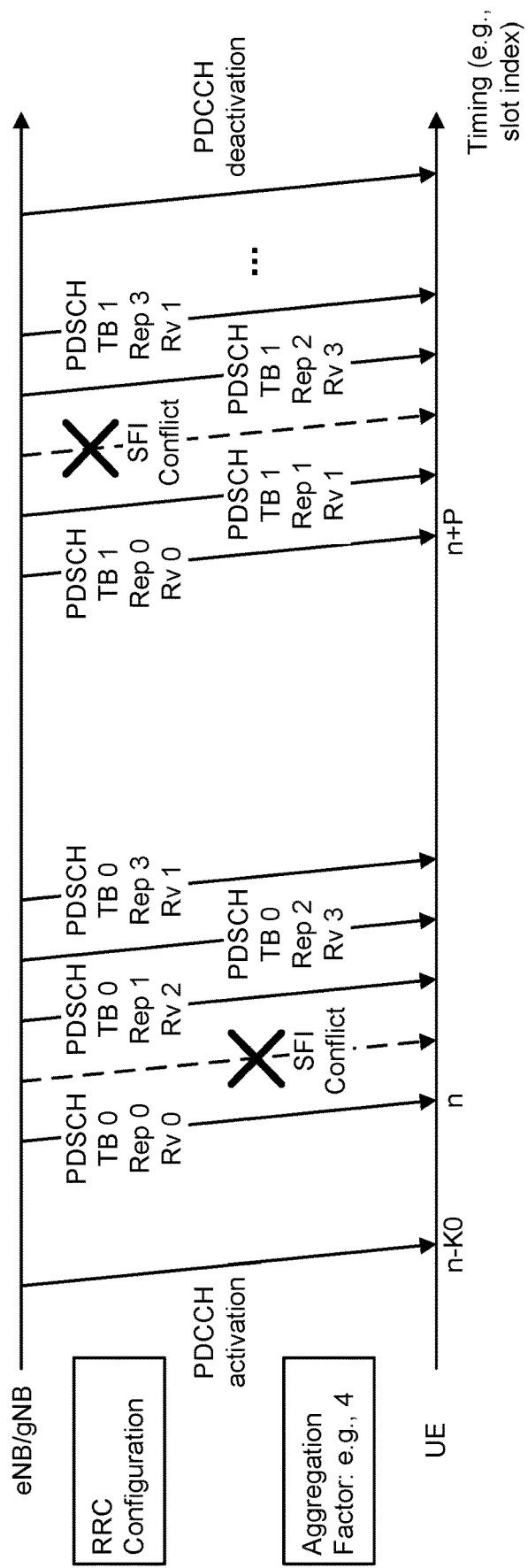
FIG. 6 is an example illustrating another approach for RV determination when DL repetition conflicts with UL by the slot format indication.

Another issue for the case of repetitions or slot aggregations is RV determination when DL repetition conflicts with UL by the slot format indication. In an approach, the UE 102 may resume the RV sequence after the conflict(s). The UE 102 may the skip the conflicted slot(s), continue to use the RV order from the next available aggregated slot. FIG. 5 is an example illustrating this approach. In another approach,
the UE 102 may assume the RV value(s) in the RV sequence applied to the conflicted slot(s) although there is no PDSCH transmission. The DL PDSCH may be skipped but the RV counting in the RV sequence is kept. Equivalently, the UE 102 may use the RV sequence corresponding to the slot index. FIG. 6 is an example illustrating this approach. Whether to resume the RV sequence after the conflict(s) or not may be configurable.

Figure 7:
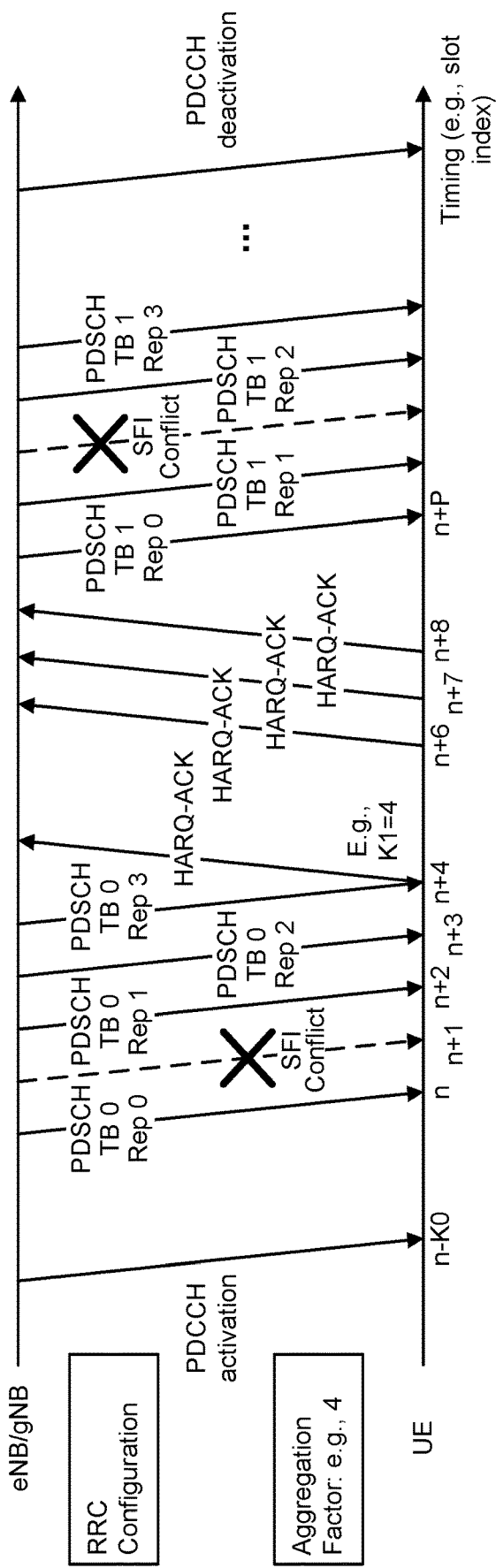
FIG. 7 is an example illustrating an approach for HARQ-ACK for repetitions in a DL SPS procedure.
Figure 8:
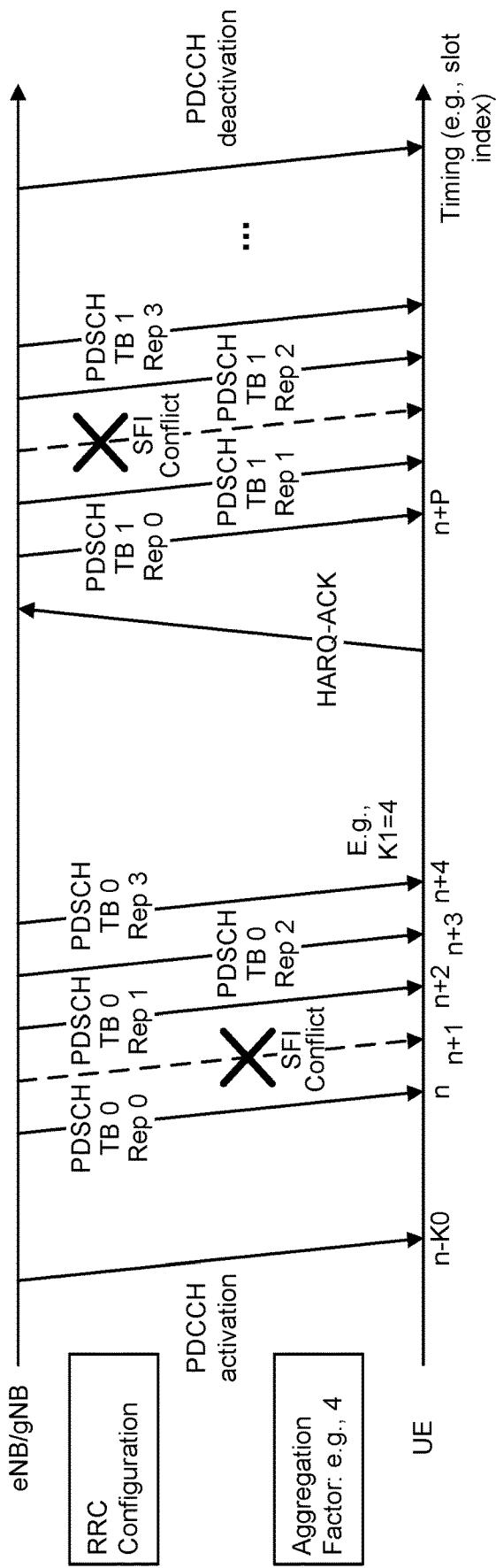
FIG. 8 is an example illustrating another approach for HARQ-ACK for repetitions in a DL SPS procedure.

Another issue for the case of repetitions or slot aggregations is HARQ-ACK for repetitions (i.e., DL SPS PDSCH repetition). In one approach, HARQ-ACK is fed back for each repetition. An example of this approach is illustrated in FIG. 7. In another approach, HARQ-ACK is fed back only for the last repetition. An example of this approach is illustrated in FIG. 8. Whether to transmit HARQ-ACK for each repetition or last repetition only is configurable (e.g., by RRC and/or by PDCCH for activation of DL SPS).

Figure 9:
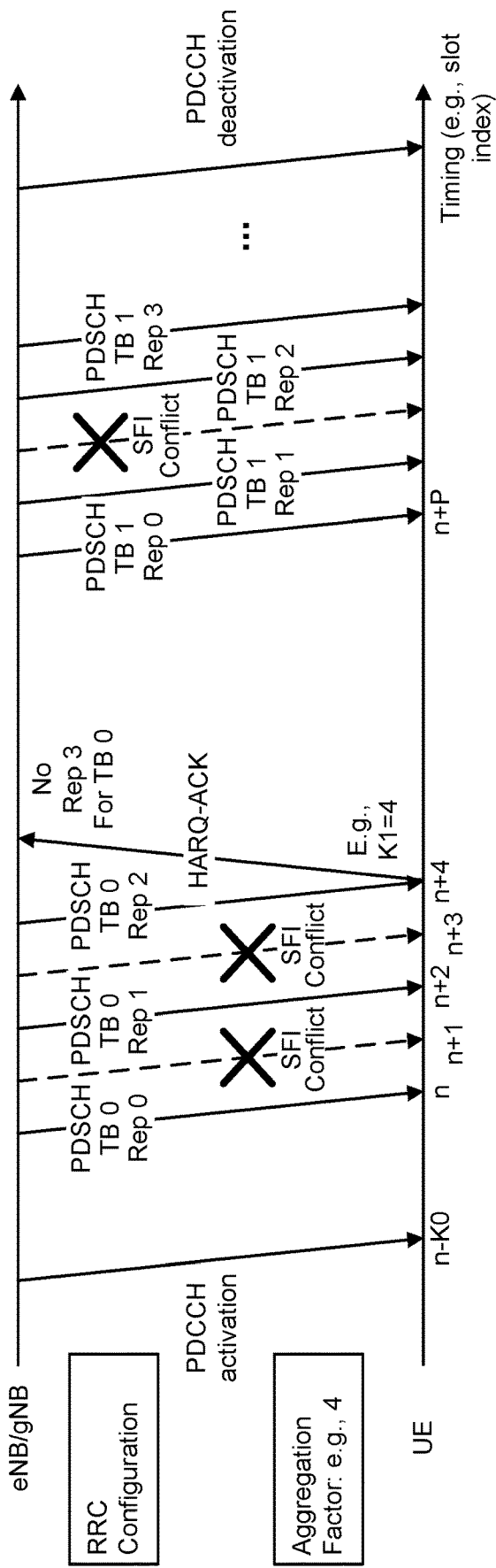
FIG. 9 is an example illustrating an approach for the condition for the termination of repetitions in a DL SPS procedure.
Figure 10:
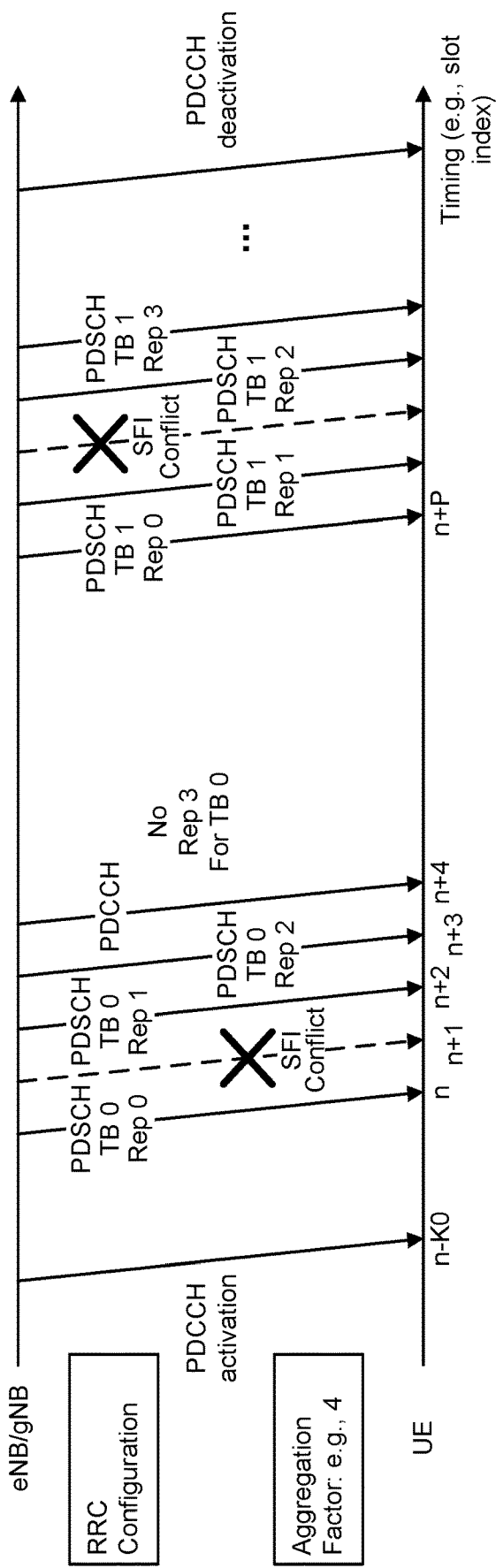
FIG. 10 is an example illustrating another approach for the condition for the termination of repetitions in a DL SPS procedure.
Figure 11:
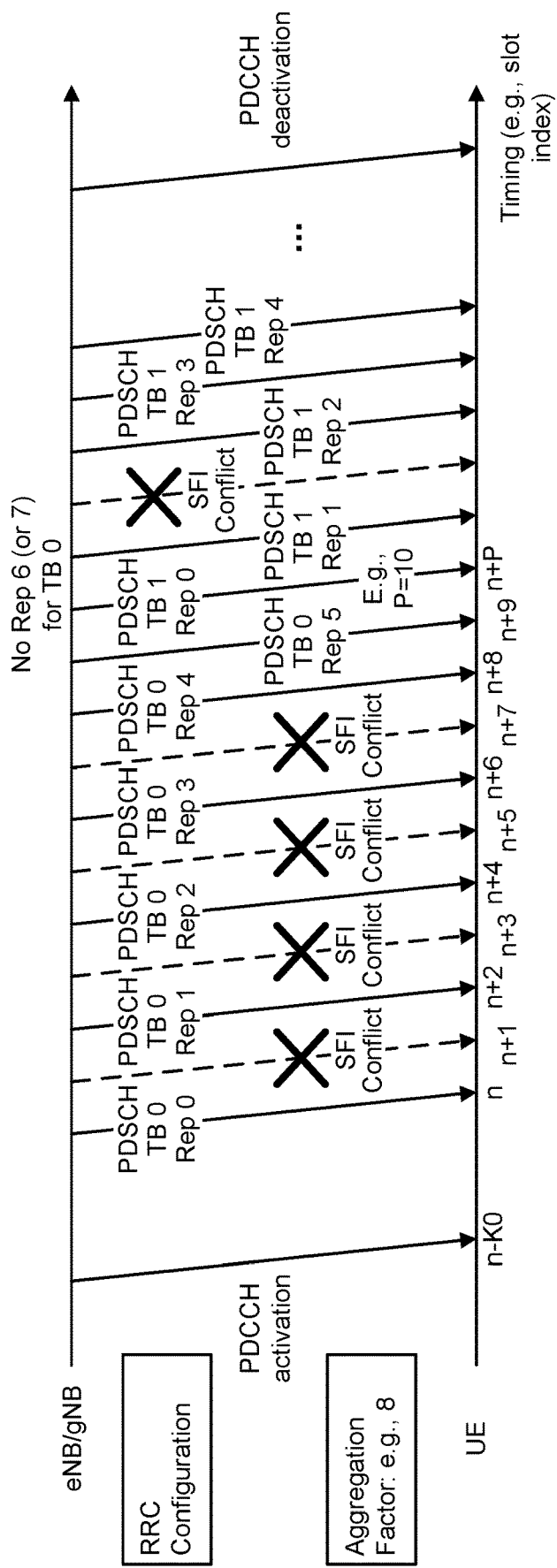
FIG. 11 is an example illustrating another approach for the condition for the termination of repetitions in a DL SPS procedure.

Another issue for the case of repetitions or slot aggregations is the condition for the termination of repetitions. In one approach for the termination of repetitions, the number of repetitions reaches the DL aggregation factor K. In another approach, ACK is received (e.g., information indicating ACK is transmitted from the UE 102 to the gNB 160 by using PUCCH and/or MAC CE). An example of this approach is illustrated in FIG. 9. In another approach, PDCCH is transmitted (e.g., a DL grant for the same TB or a new TB). An example of this approach is illustrated in FIG. 10. In yet another approach, a condition for the termination of repetitions may include a periodicity boundary is reached. An example of this approach is illustrated in FIG. 11.

Another issue for the case of repetitions or slot aggregations is HARQ-ACK handling for conflicts. In an approach, for all the HARQ-ACK to repetitions, the methods and approaches described in connection with FIG. 3 may be applied. In another approach, HARQ-ACK for repetitions except the last one may be dropped. The methods and approaches described in connection with FIG. 3 may be applied to the HARQ-ACK corresponding to the last repetition.

In another aspect, for each DL bandwidth part (BWP) of a serving cell where a UE 102 is configured to monitor PDCCH in a search space (e.g., common search space, and/or UE-specific search space), the UE 102 may be configured by one or more of the following higher layer parameter (e.g., information configured by RRC).

For the search space set s in the control resource set p, an indication that the search space set is a common search space set or a UE-specific search space set by higher layer parameter (e.g., information configured by RRC). If the search space is a common search space, an indication by higher layer parameter RNTI-monitoring to monitor PDCCH in the search space for DCI format 0_0 (e.g., DCI format used for scheduling of PUSCH, fallback DCI format for PUSCH scheduling) and DCI format 1_0 (e.g., DCI format used for scheduling of PUSCH, fallback DCI format for PDSCH scheduling). If the search space is a UE-specific search space, an indication by higher layer parameter USS-DCI format to monitor PDCCH in the search space either for DCI format 0_0 and DCI format 1_0, or for DCI format 0_1 (e.g., DCI format used for scheduling of PUSCH, non-fallback DCI format for PUSCH scheduling) and DCI format 1_1 (e.g., DCI format used for scheduling of PUSCH, non-fallback DCI format for PUSCH scheduling). A PDCCH monitoring periodicity of $k_{p,s}$ slots by higher layer parameter (e.g., information configured by RRC). A PDCCH monitoring offset of $o_{p,s}$ slots, where $0 \leq o_{p,s} < k_{p,s}$, by higher layer parameter (e.g., information configured by RRC).

A UE 102 may determine a PDCCH monitoring occasion from the PDCCH monitoring periodicity, the PDCCH monitoring offset, and the PDCCH monitoring pattern within a slot.

DCI formats for scheduling of PDSCH (e.g., DCI formats used for activation of DL SPS) are also described herein. Format 1_0 (e.g., fallback DCI) may be used for the scheduling of PDSCH in one DL cell. The following information may be transmitted by means of the DCI format 1_0: identifier for DCI formats (1 bits); frequency domain resource assignment ($\lceil \log_2(N_{RB}^{UL,BWP}(N_{RB}^{UL,BWP}+1)/2) \rceil$ bits); time domain resource assignment (e.g., timing information for K0) (X bits); VRB-to-PRB mapping (1 bit); modulation and coding scheme (5 bits); new data indicator (1 bit); redundancy version (2 bits); HARQ process number (4 bits); downlink assignment index (2 bits); TPC command for scheduled PUCCH (2 bits); PUCCH resource indicator (2 bits); and PDSCH-to-HARQ_feedback timing indicator (e.g., timing information for K1 and/or K1_0) (3 bits).

DCI format 1_1 may be used for the scheduling of PDSCH in one cell. The following information may be transmitted by means of the DCI format 1_1:

Carrier indicator (0 or 3 bits).

Identifier for DCI formats (1 bits).

Bandwidth part indicator (0, 1 or 2 bits). The bit-width for this field may be determined according to the higher layer parameter (e.g., information configured by RRC) for the PDSCH.

Frequency domain resource assignment (X bits).

Time domain resource assignment (e.g., timing information for K0) (1, 2, 3, or 4 bits). The bit-width for this field may be determined according to the higher layer parameter (e.g., information configured by RRC).

For transport block 1: Modulation and coding scheme (5 bits); a new data indicator (1 bit); and/or redundancy version (2 bits).

For transport block 2: Modulation and coding scheme (5 bits); a new data indicator (1 bit); and/or redundancy version (2 bits).

HARQ process number (4 bits).

Downlink assignment index (X bits).

TPC command for scheduled PUCCH (2 bits).

PUCCH resource indicator (2 bits).

PDSCH-to-HARQ_feedback timing indicator (e.g., timing information for K1 and/or K1_0) (3 bits).

SRS request (2 bits).

CBG transmission information (0, 2, 4, 6, or 8 bits), determined by higher layer parameter (e.g., information configured by RRC) for the PDSCH.

CBG flushing out information (0 or 1 bit), determined by higher layer parameter (e.g., information configured by RRC).

Regarding, PDCCH validation for semi-persistent scheduling (e.g., DCI setting for activation of DL SPS), a UE 102 may validate a Semi-Persistent Scheduling assignment PDCCH only if all the following conditions are met: the CRC parity bits obtained for the PDCCH payload are scrambled with the CS-RNTI (i.e., configured scheduling RNTI) and the new data indicator field is set to '0'. Validation is achieved if all the fields for the respective used DCI format are set according to Table 1, which includes special fields for semi-persistent scheduling activation PDCCH validation. If validation is achieved, the UE 102 may consider the received DCI information accordingly as a valid semi-persistent activation (e.g., DCI format for activation of Dl SPS).

TABLE 1

|  | DCI format 1_0 | DCI format 1_1 |
| --- | --- | --- |
| TPC command for scheduled PUSCH | set to '00' | N/A |
| Downlink assignment index | set to '00' | N/A |
| Modulation and coding scheme | MSB is set to '0' | N/A |
| HARQ process number | N/A | set to '000' |
| Modulation and coding scheme | N/A | MSB is set to '0' |
| Redundancy version | N/A | set to '00' |

FIG. 5 is an example illustrating an approach for RV determination when DL repetition conflicts with UL by the slot format indication. In this approach, the UE 102 may the skip the conflicted slot(s), and may continue to use the RV order from the next available aggregated slot.

FIG. 6 is an example illustrating another approach for RV determination when DL repetition conflicts with UL by the slot format indication. In this approach, the UE 102 may assume the RV value(s) in the RV sequence applied to the conflicted slot(s) although there is no PDSCH transmission. The DL PDSCH may be skipped but the RV counting in the RV sequence is kept. Equivalently, the UE 102 may use the RV sequence corresponding to the slot index.

FIG. 7 is an example illustrating an approach for HARQ-ACK for repetitions in a DL SPS procedure. In this approach, HARQ-ACK is fed back for each repetition.

FIG. 8 is an example illustrating another approach for HARQ-ACK for repetitions in a DL SPS procedure. In this approach, HARQ-ACK is fed back only for the last repetition.

FIG. 9 is an example illustrating an approach for the condition for the termination of repetitions in a DL SPS procedure. In this approach, termination of repetitions occurs when ACK is received (e.g., information indicating ACK is transmitted from the UE 102 to the gNB 160 by using PUCCH and/or MAC CE).

FIG. 10 is an example illustrating another approach for the condition for the termination of repetitions in a DL SPS procedure. In this approach, termination of repetitions occurs when PDCCH is transmitted (e.g., a DL grant for the same TB or a new TB).

FIG. 11 is an example illustrating another approach for the condition for the termination of repetitions in a DL SPS procedure. In this approach, termination of repetitions occurs when a periodicity boundary is reached.

Figure 12:
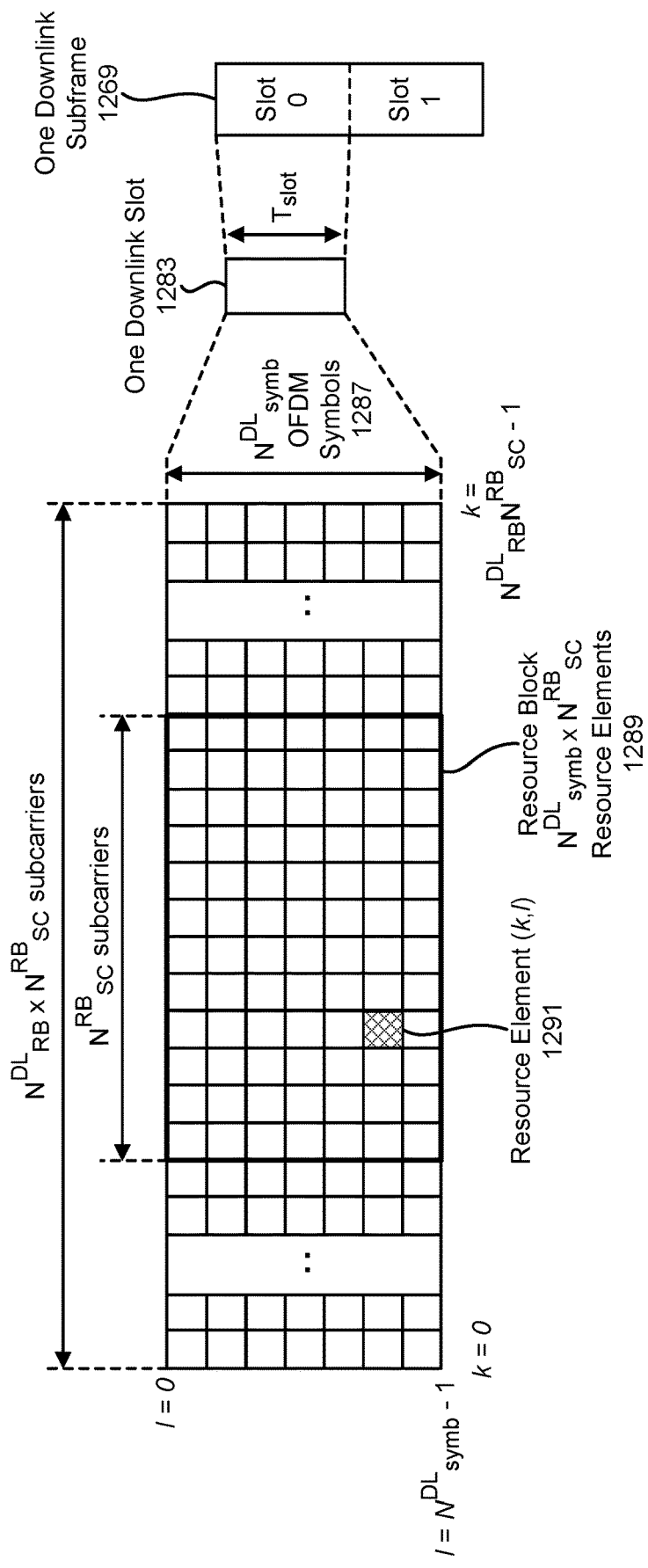
FIG. 12 is a diagram illustrating an example of a resource grid for the downlink.

FIG. 12 is a diagram illustrating one example of a resource grid for the downlink. The resource grid illustrated in FIG. 12 may be utilized in some implementations of the systems and methods disclosed herein. More detail regarding the resource grid is given in connection with FIG. 1.

In FIG. 12, one downlink subframe 1269 may include two downlink slots 1283. $N^{DL}_{RB}$ is downlink bandwidth configuration of the serving cell, expressed in multiples of $N^{RB}_{sc}$, where $N^{RB}_{sc}$ is a resource block 1289 size in the frequency domain expressed as a number of subcarriers, and $N^{DL}_{symb}$ is the number of OFDM symbols 1287 in a downlink slot 1283. A resource block 1289 may include a number of resource elements (RE) 1291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 1291 may be the RE 1291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 13:
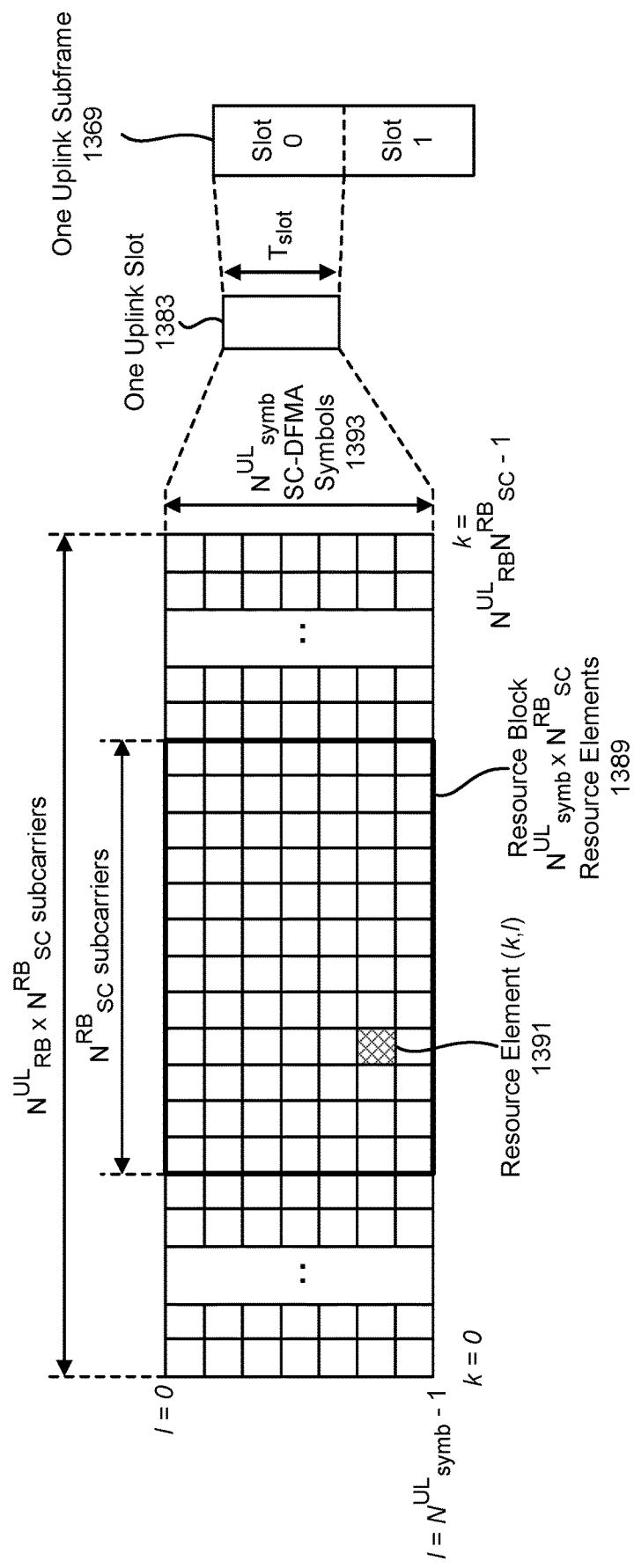
FIG. 13 is a diagram illustrating one example of a resource grid for the uplink.

FIG. 13 is a diagram illustrating one example of a resource grid for the uplink. The resource grid illustrated in FIG. 13 may be utilized in some implementations of the systems and methods disclosed herein. More detail regarding the resource grid is given in connection with FIG. 1.

In FIG. 13, one uplink subframe 1369 may include two uplink slots 1383. $N^{UL}_{RB}$ is uplink bandwidth configuration of the serving cell, expressed in multiples of $N^{RB}_{sc}$, where $N^{RB}_{sc}$ is a resource block 1389 size in the frequency domain expressed as a number of subcarriers, and $N^{UL}_{symb}$ is the number of SC-FDMA symbols 1393 in an uplink slot 1383. A resource block 1389 may include a number of resource elements (RE) 1391.

For a PCell, $N^{UL}_{RB}$ is broadcast as a part of system information. For an SCell (including an LAA SCell), $N^{UL}_{RB}$ is RB configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k, l) in a slot, where k and l are indices in the frequency and time domains respectively. While uplink subframes in one component carrier (CC) are discussed herein, uplink subframes are defined for each CC.

Figure 14:
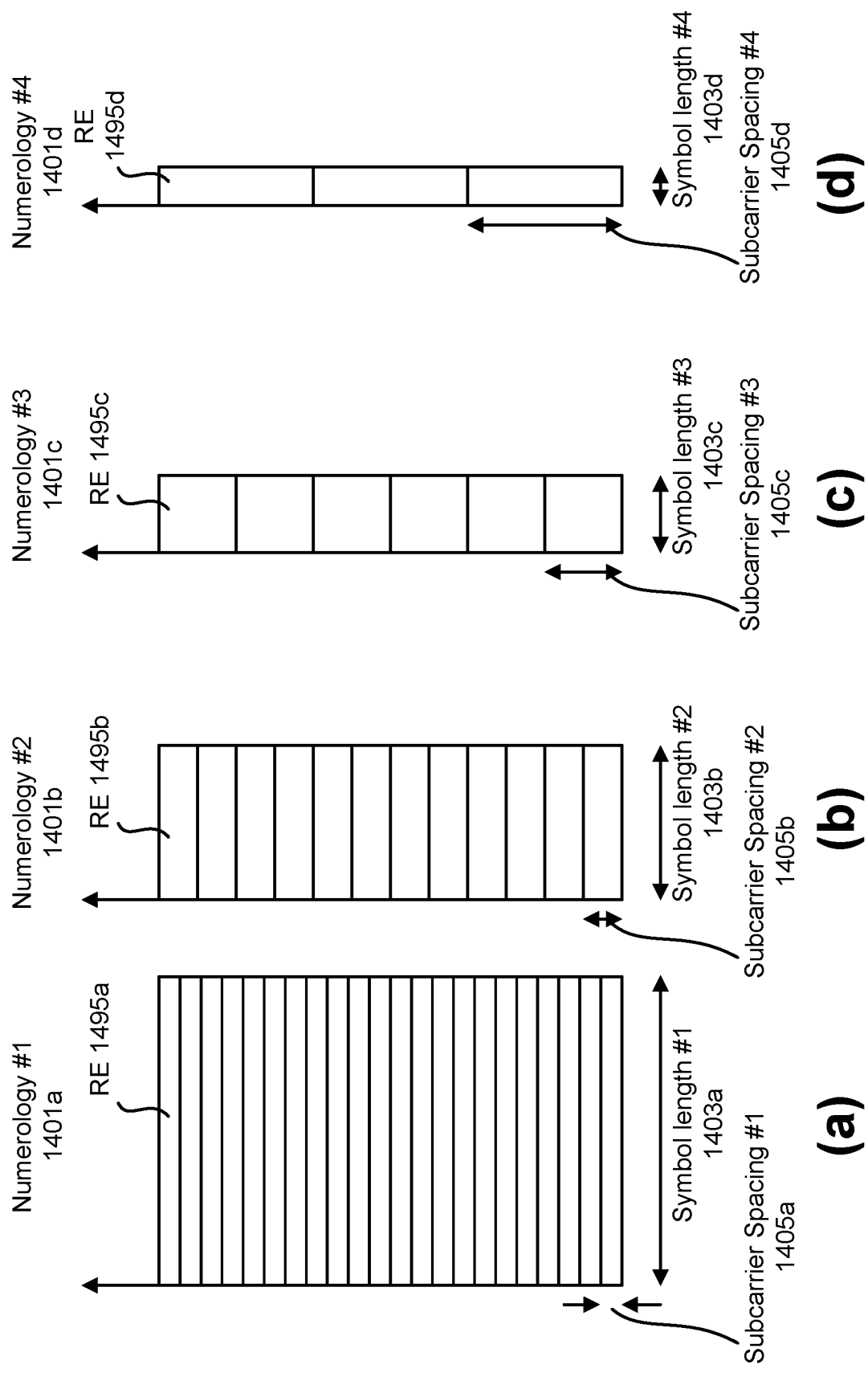
FIG. 14 shows examples of several numerologies.

FIG. 14 shows examples of several numerologies 1401. The numerology #1 1401a may be a basic numerology (e.g., a reference numerology). For example, a RE 1495a of the basic numerology 1401a may be defined with subcarrier spacing 1405a of 15 kHz in frequency domain and 2048 Ts+CP length (e.g., 160 Ts or 144 Ts) in time domain (i.e., symbol length #1 1403a), where Ts denotes a baseband sampling time unit defined as 1/(15000*2048) seconds. For the i-th numerology, the subcarrier spacing 1405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 14 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 15:
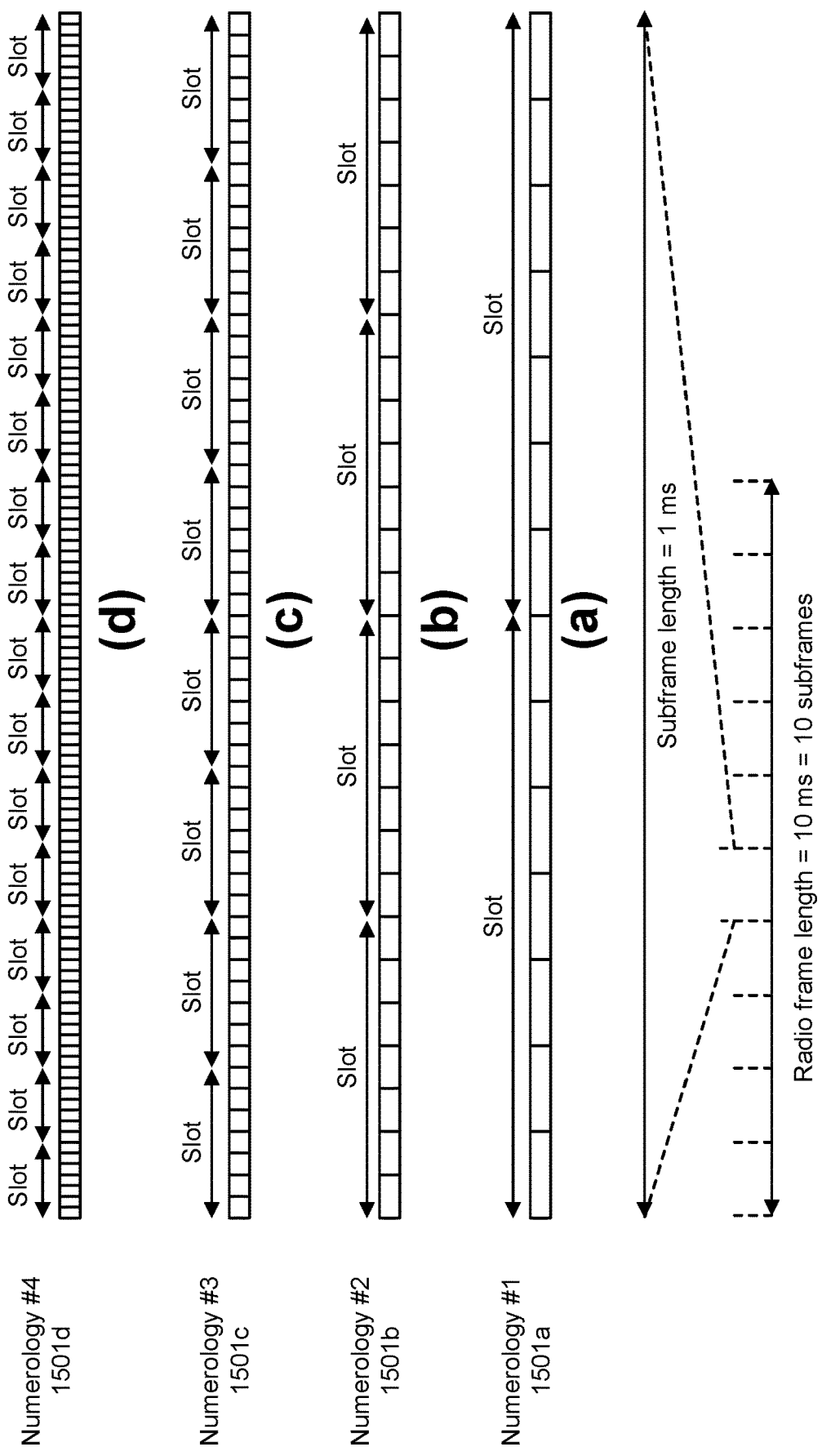
FIG. 15 shows examples of subframe structures for the numerologies that are shown in FIG. 14.

FIG. 15 shows examples of subframe structures for the numerologies 1501 that are shown in FIG. 14. Given that a slot 1283 includes $N^{DL}_{symb}$ (or $N^{UL}_{symb}$)=7 symbols, the slot length of the i+1-th numerology 1501 is a half of the one for the i-th numerology 1501, and eventually the number of slots 1283 in a subframe (i.e., 1 ms) becomes double. It may be noted that a radio frame may include 10 subframes, and the radio frame length may be equal to 10 ms.

Figure 16:
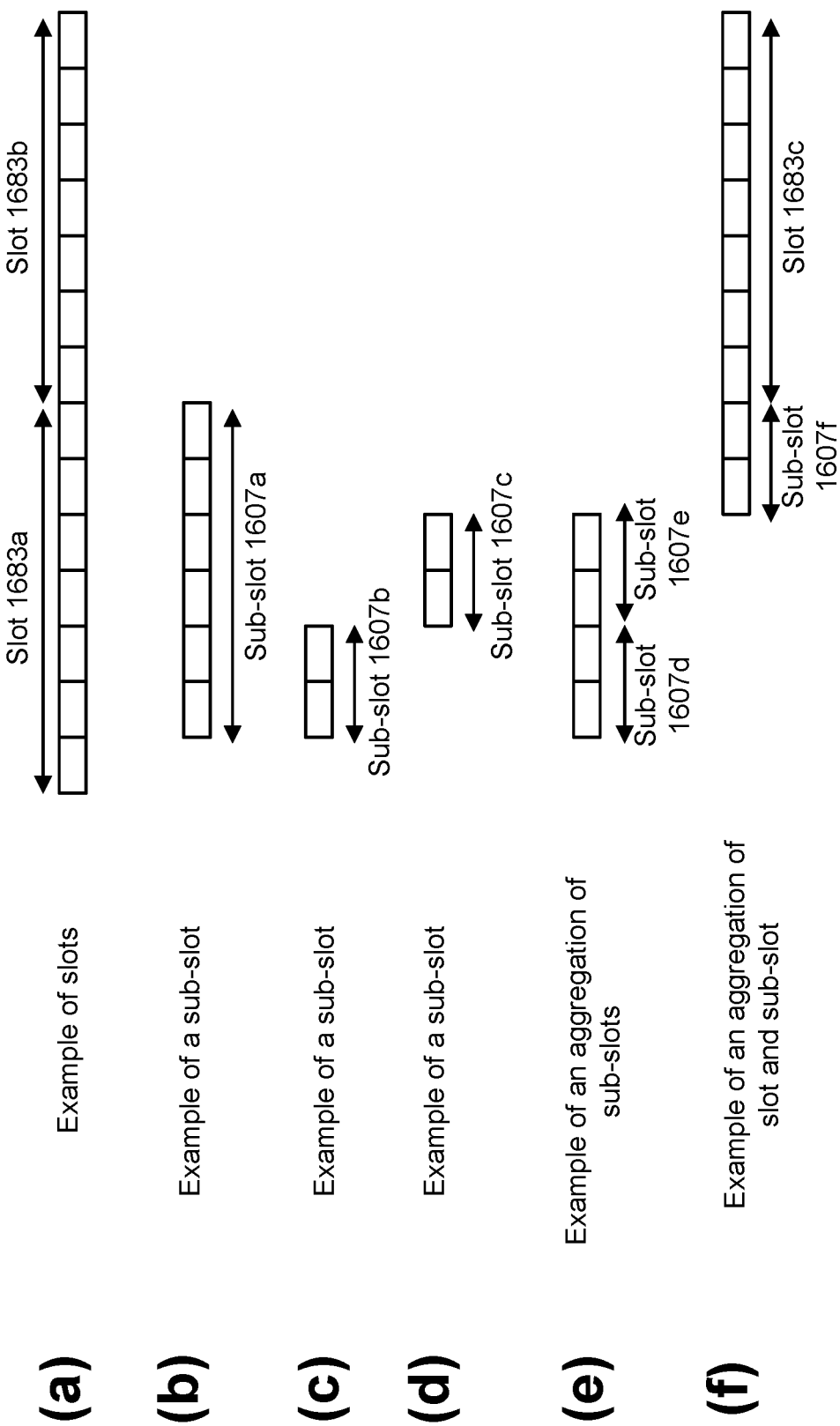
FIG. 16 shows examples of slots and sub-slots.

FIG. 16 shows examples of slots 1683 and sub-slots 1607. If a sub-slot 1607 is not configured by higher layer, the UE 102 and the eNB/gNB 160 may only use a slot 1683 as a scheduling unit. More specifically, a given transport block may be allocated to a slot 1683. If the sub-slot 1607 is configured by higher layer, the UE 102 and the eNB/gNB 160 may use the sub-slot 1607 as well as the slot 1683. The sub-slot 1607 may include one or more OFDM symbols. The maximum number of OFDM symbols that constitute the sub-slot 1607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 1607 may start at any symbol within a slot 1683 unless it collides with a control channel. There could be restrictions of mini-slot length based on restrictions on starting position. For example, the sub-slot 1607 with the length of $N^{DL}_{symb}-1$ (or $N^{UL}_{symb}-1$) may start at the second symbol in a slot 1683. The starting position of a sub-slot 1607 may be indicated by a physical layer control channel (e.g., by DCI format). Alternatively, the starting position of a sub-slot 1607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 1607.

In cases when the sub-slot 1607 is configured, a given transport block may be allocated to either a slot 1683, a sub-slot 1607, aggregated sub-slots 1607 or aggregated sub-slot(s) 1607 and slot 1683. This unit may also be a unit for HARQ-ACK bit generation.

Figure 17:
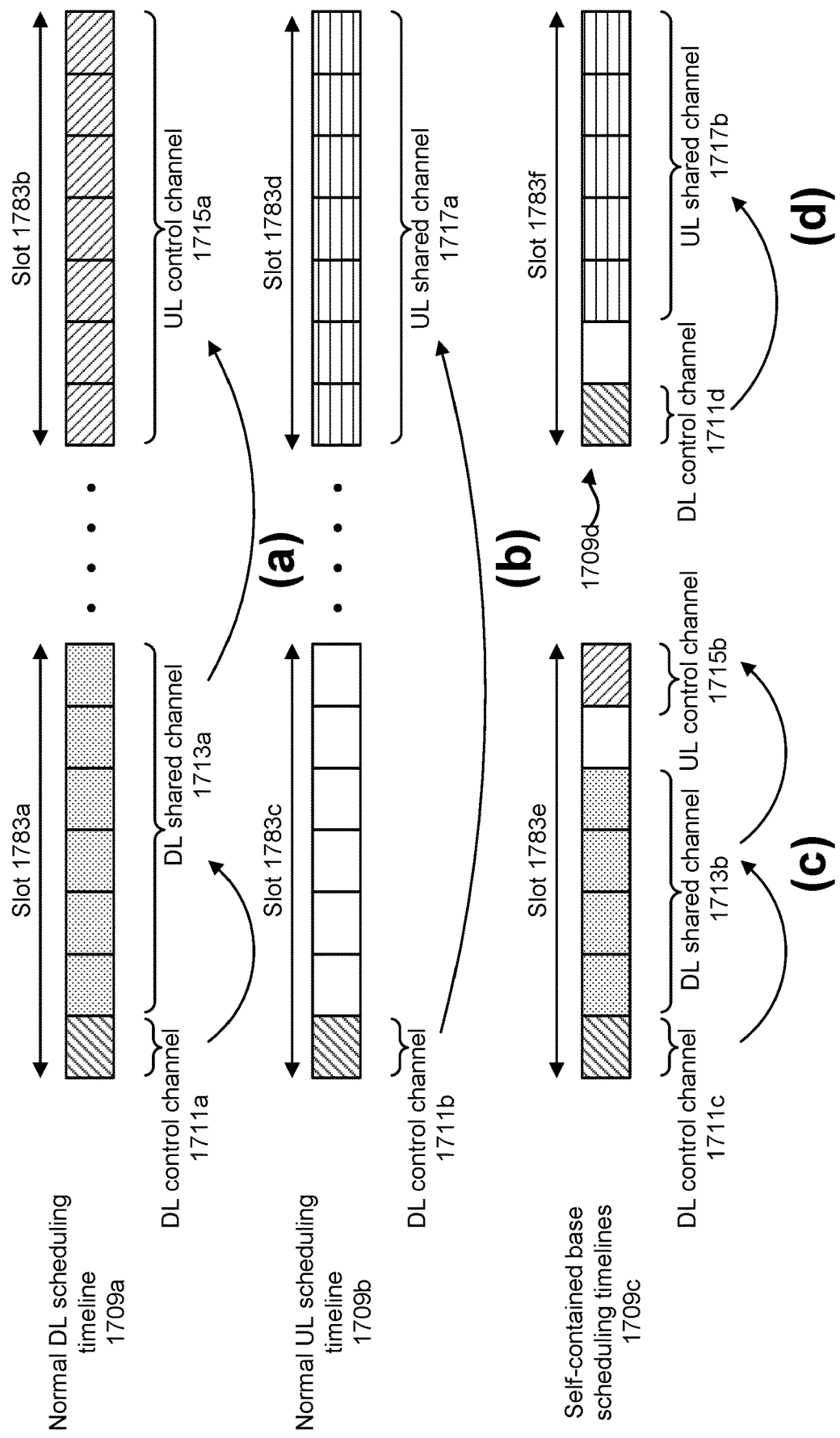
FIG. 17 shows examples of scheduling timelines.

FIG. 17 shows examples of scheduling timelines 1709. For a normal DL scheduling timeline 1709a, DL control channels are mapped the initial part of a slot 1783a. The DL control channels 1711 schedule DL shared channels 1713a in the same slot 1783a. HARQ-ACKs for the DL shared channels 1713a (i.e., HARQ-ACKs each of which indicates whether or not transport block in each DL shared channel 1713a is detected successfully) are reported via UL control channels 1715a in a later slot 1783b. In this instance, a given slot 1783 may contain either one of DL transmission and UL transmission.

For a normal UL scheduling timeline 1709b, DL control channels 1711b are mapped the initial part of a slot 1783c. The DL control channels 1711b schedule UL shared channels 1717a in a later slot 1783d. For these cases, the association timing (time shift) between the DL slot 1783c and the UL slot 1783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1709c, DL control channels 1711c are mapped to the initial part of a slot 1783e. The DL control channels 1711c schedule DL shared channels 1713b in the same slot 1783e. HARQ-ACKs for the DL shared channels 1713b are reported in UL control channels 1715b, which are mapped at the ending part of the slot 1783e.

For a self-contained base UL scheduling timeline 1709d, DL control channels 1711d are mapped to the initial part of a slot 1783f. The DL control channels 1711d schedule UL shared channels 1717b in the same slot 1783f. For these cases, the slot 1783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

FIG. 18 shows examples of DL control channel monitoring regions. One or more sets of PRB(s) may be configured for DL control channel monitoring. In other words, a control resource set is, in the frequency domain, a set of PRB s within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 19:
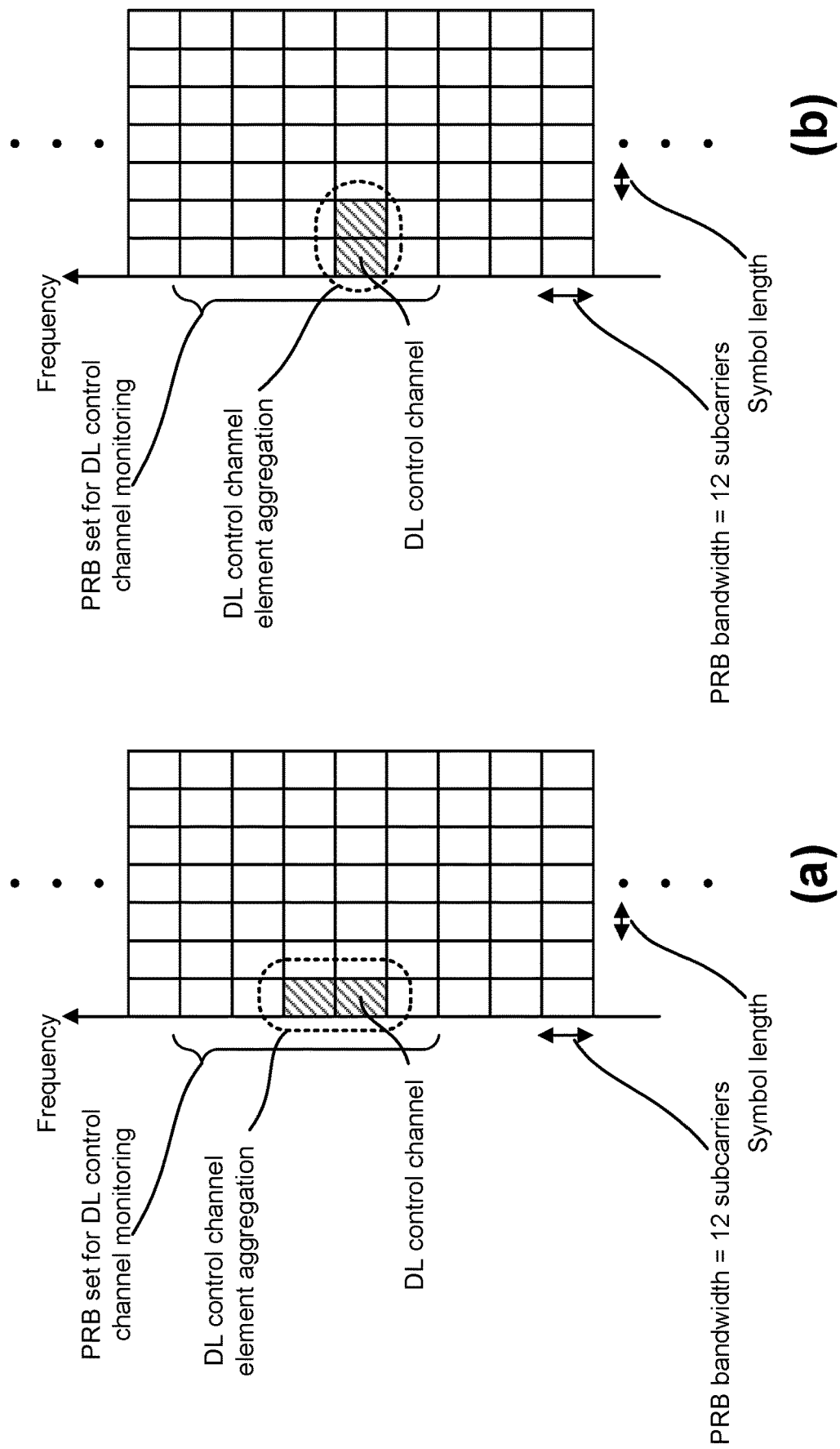
FIG. 19 shows examples of DL control channel which includes more than one control channel elements.

FIG. 19 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 20:
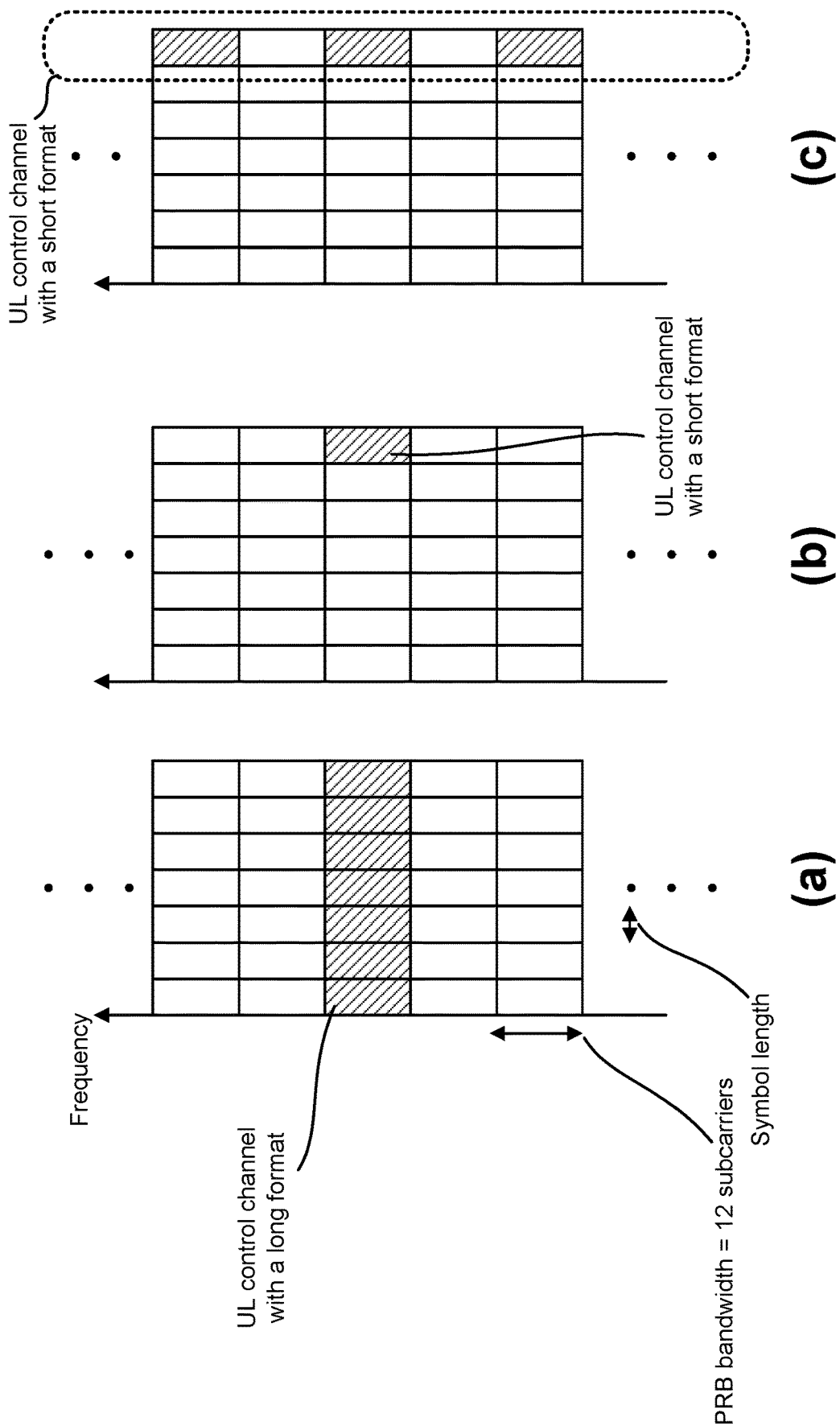
FIG. 20 shows examples of UL control channel structures.

FIG. 20 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 21:
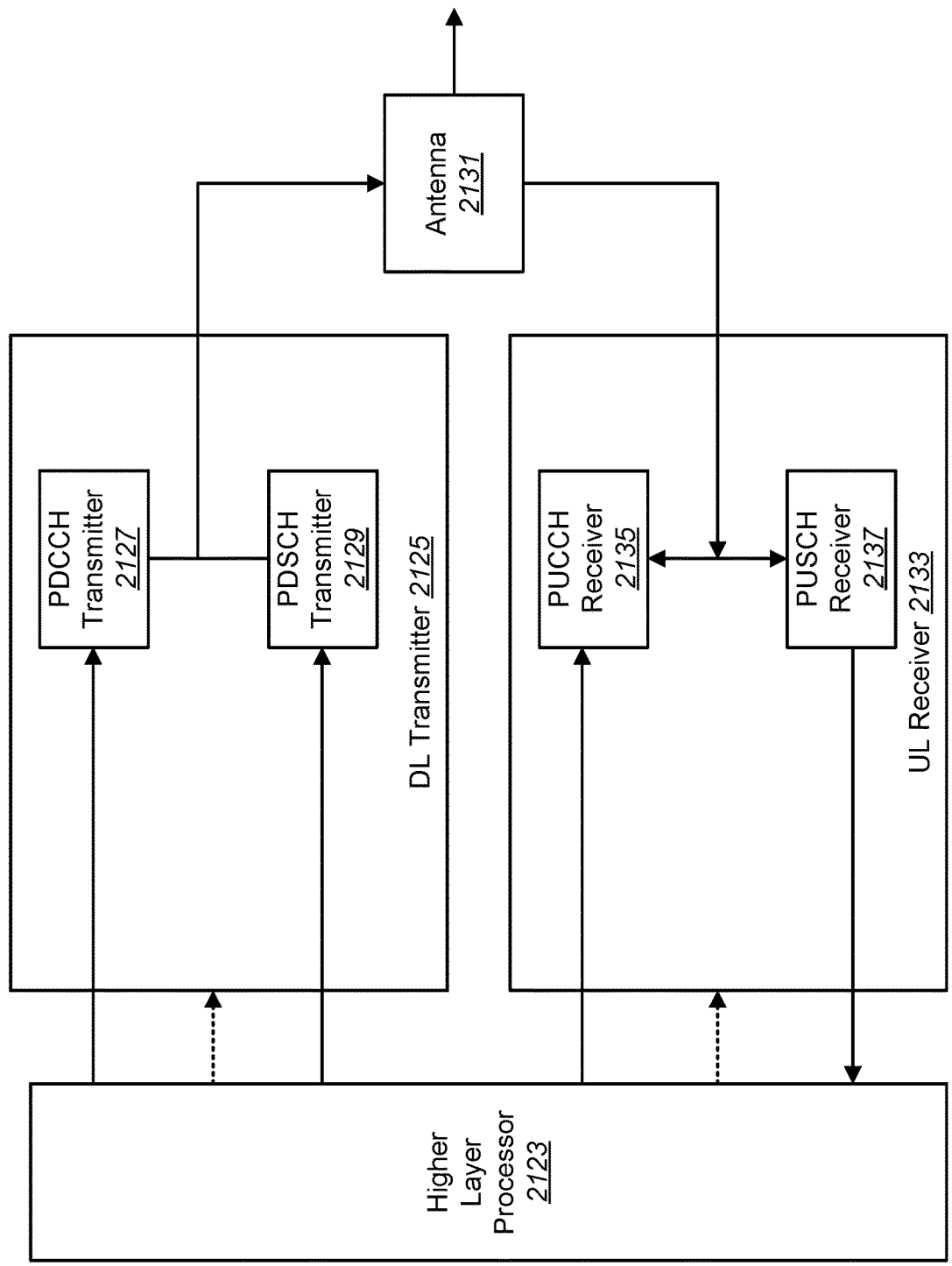
FIG. 21 is a block diagram illustrating one implementation of a gNB.

FIG. 21 is a block diagram illustrating one implementation of a gNB 2160. The gNB 2160 may include a higher layer processor 2123, a DL transmitter 2125, a UL receiver 2133, and one or more antenna 2131. The DL transmitter 2125 may include a PDCCH transmitter 2127 and a PDSCH transmitter 2129. The UL receiver 2133 may include a PUCCH receiver 2135 and a PUSCH receiver 2137.

The higher layer processor 2123 may manage physical layer's behaviors (the DL transmitter's and the UL receiver's behaviors) and provide higher layer parameters to the physical layer. The higher layer processor 2123 may obtain transport blocks from the physical layer. The higher layer processor 2123 may send/acquire higher layer messages such as an RRC message and MAC message to/from a UE's higher layer. The higher layer processor 2123 may provide the PDSCH transmitter transport blocks and provide the PDCCH transmitter transmission parameters related to the transport blocks.

The DL transmitter 2125 may multiplex downlink physical channels and downlink physical signals (including reservation signal) and transmit them via transmission antennas 2131. The UL receiver 2133 may receive multiplexed uplink physical channels and uplink physical signals via receiving antennas 2131 and de-multiplex them. The PUCCH receiver 2135 may provide the higher layer processor 2123 UCI. The PUSCH receiver 2137 may provide the higher layer processor 2123 received transport blocks.

Figure 22:
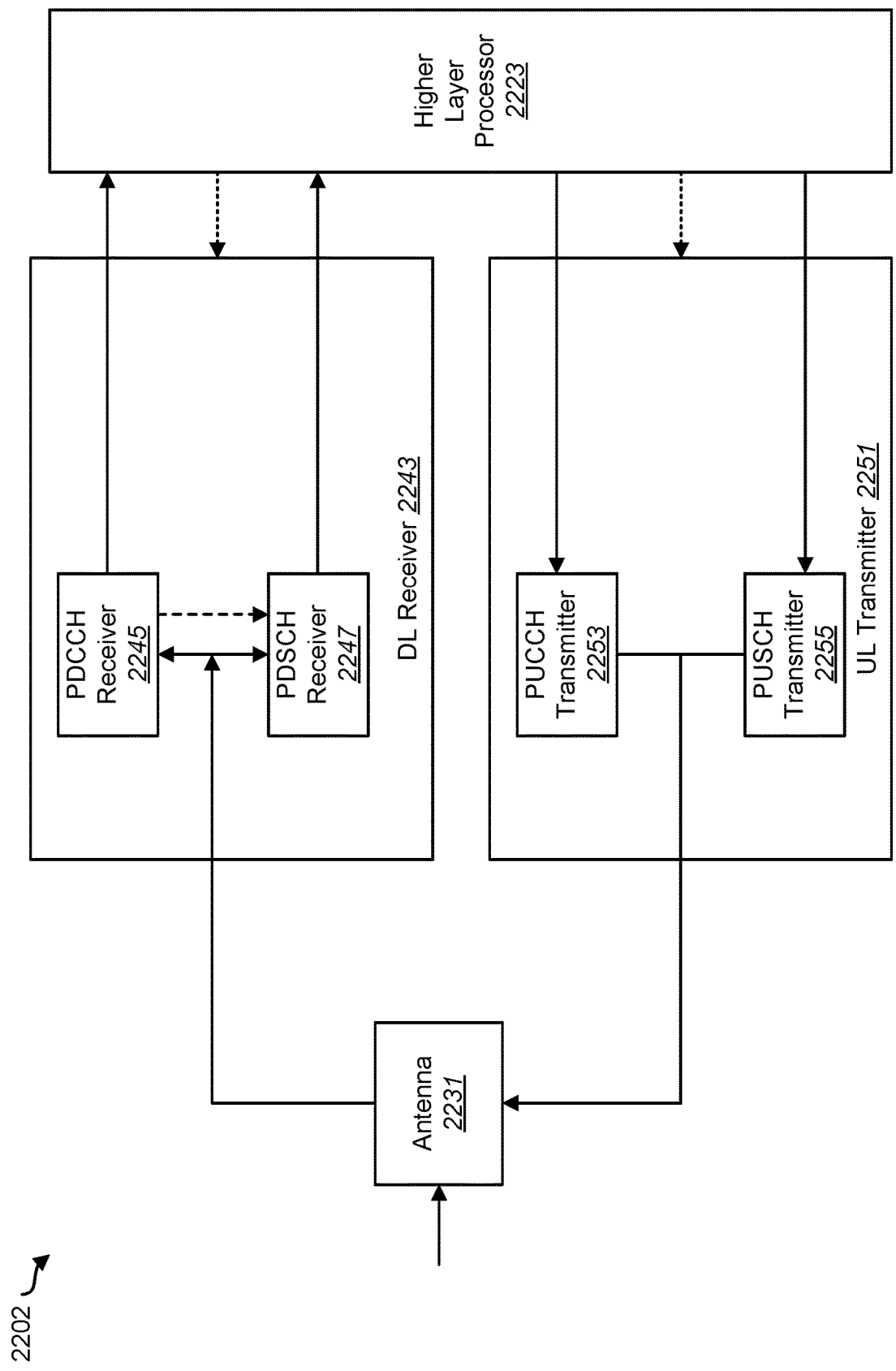
FIG. 22 is a block diagram illustrating one implementation of a UE.

FIG. 22 is a block diagram illustrating one implementation of a UE 2202. The UE 2202 may include a higher layer processor 2223, a UL transmitter 2251, a DL receiver 2243, and one or more antenna 2231. The UL transmitter 2251 may include a PUCCH transmitter 2253 and a PUSCH transmitter 2255. The DL receiver 2243 may include a PDCCH receiver 2245 and a PDSCH receiver 2247.

The higher layer processor 2223 may manage physical layer's behaviors (the UL transmitter's and the DL receiver's behaviors) and provide higher layer parameters to the physical layer. The higher layer processor 2223 may obtain transport blocks from the physical layer. The higher layer processor 2223 may send/acquire higher layer messages such as an RRC message and MAC message to/from a UE's higher layer. The higher layer processor 2223 may provide the PUSCH transmitter transport blocks and provide the PUCCH transmitter 2253 UCI.

The DL receiver 2243 may receive multiplexed downlink physical channels and downlink physical signals via receiving antennas 2231 and de-multiplex them. The PDCCH receiver 2245 may provide the higher layer processor 2223 DCI. The PDSCH receiver 2247 may provide the higher layer processor 2223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 23:
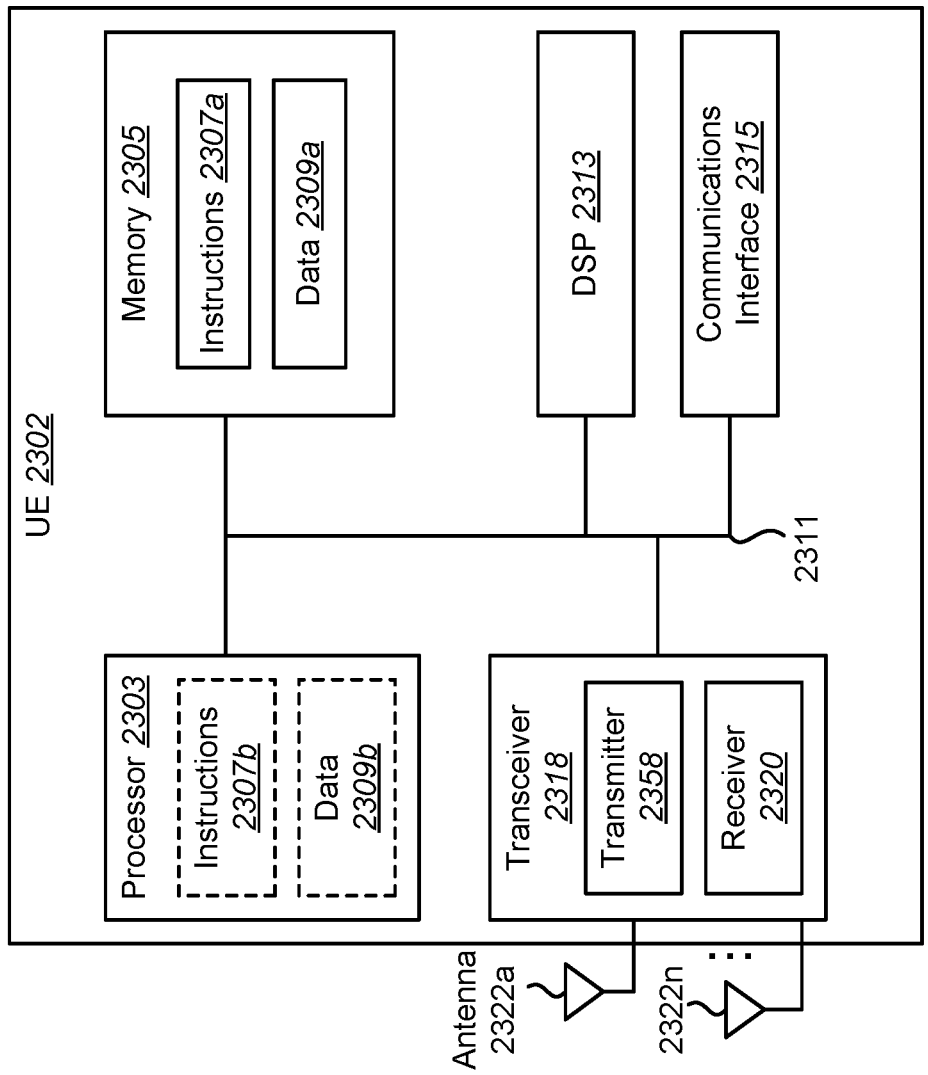
FIG. 23 illustrates various components that may be utilized in a UE.

FIG. 23 illustrates various components that may be utilized in a UE 2302. The UE 2302 described in connection with FIG. 23 may be implemented in accordance with the UE 102 described in connection with FIG. 1. The UE 2302 includes a processor 2303 that controls operation of the UE 2302. The processor 2303 may also be referred to as a central processing unit (CPU). Memory 2305, which may include read-only memory (ROM), random access memory (RAM), a combination of the two or any type of device that may store information, provides instructions 2307a and data 2309a to the processor 2303. A portion of the memory 2305 may also include non-volatile random-access memory (NVRAM). Instructions 2307b and data 2309b may also reside in the processor 2303. Instructions 2307b and/or data 2309b loaded into the processor 2303 may also include instructions 2307a and/or data 2309a from memory 2305 that were loaded for execution or processing by the processor 2303. The instructions 2307b may be executed by the processor 2303 to implement the methods described above.

The UE 2302 may also include a housing that contains one or more transmitters 2358 and one or more receivers 2320 to allow transmission and reception of data. The transmitter(s) 2358 and receiver(s) 2320 may be combined into one or more transceivers 2318. One or more antennas 2322a-n are attached to the housing and electrically coupled to the transceiver 2318.

The various components of the UE 2302 are coupled together by a bus system 2311, which may include a power bus, a control signal bus and a status signal bus, in addition to a data bus. However, for the sake of clarity, the various buses are illustrated in FIG. 23 as the bus system 2311. The UE 2302 may also include a digital signal processor (DSP) 2313 for use in processing signals. The UE 2302 may also include a communications interface 2315 that provides user access to the functions of the UE 2302. The UE 2302 illustrated in FIG. 23 is a functional block diagram rather than a listing of specific components.

Figure 24:
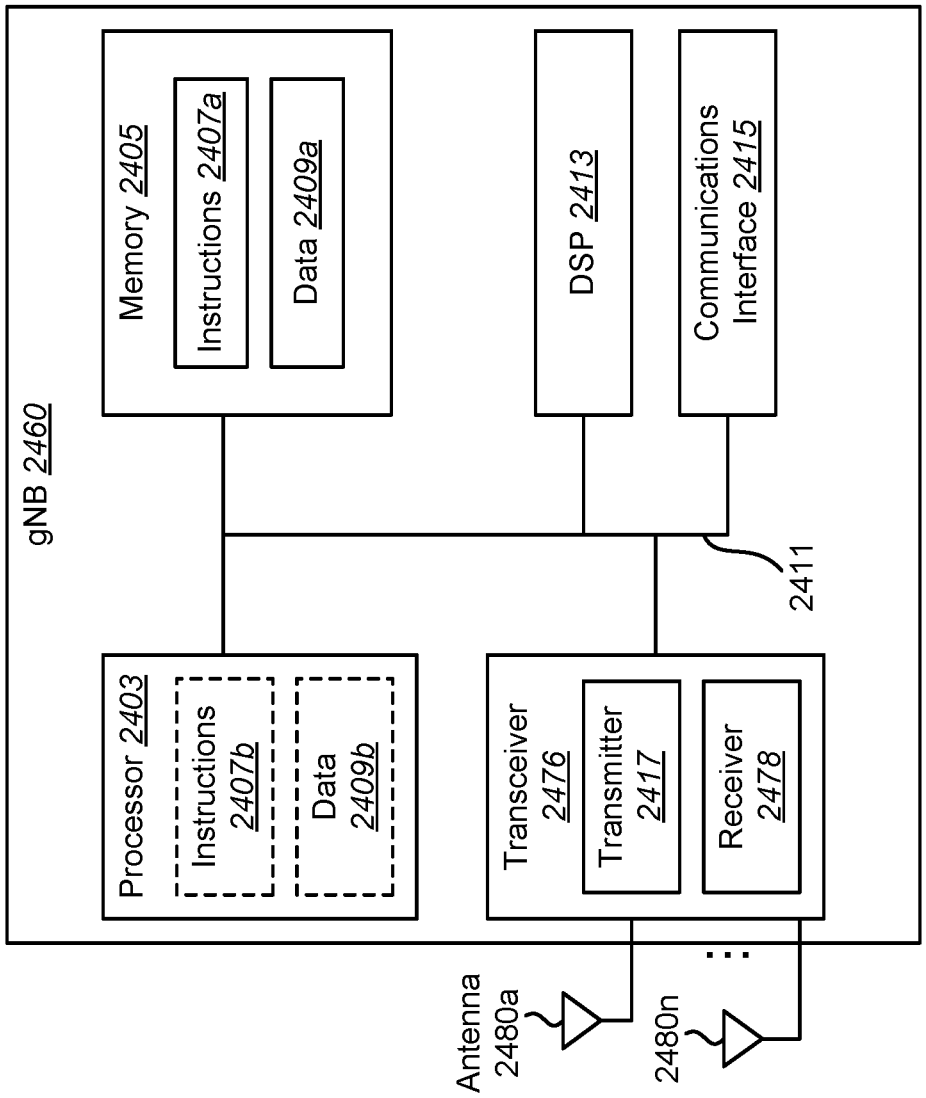
FIG. 24 illustrates various components that may be utilized in a gNB.

FIG. 24 illustrates various components that may be utilized in a gNB 2460. The gNB 2460 described in connection with FIG. 24 may be implemented in accordance with the gNB 160 described in connection with FIG. 1. The gNB 2460 includes a processor 2403 that controls operation of the gNB 2460. The processor 2403 may also be referred to as a central processing unit (CPU). Memory 2405, which may include read-only memory (ROM), random access memory (RAM), a combination of the two or any type of device that may store information, provides instructions 2407a and data 2409a to the processor 2403. A portion of the memory 2405 may also include non-volatile random-access memory (NVRAM). Instructions 2407b and data 2409b may also reside in the processor 2403. Instructions 2407b and/or data 2409b loaded into the processor 2403 may also include instructions 2407a and/or data 2409a from memory 2405 that were loaded for execution or processing by the processor 2403. The instructions 2407b may be executed by the processor 2403 to implement the methods described above.

The gNB 2460 may also include a housing that contains one or more transmitters 2417 and one or more receivers 2478 to allow transmission and reception of data. The transmitter(s) 2417 and receiver(s) 2478 may be combined into one or more transceivers 2476. One or more antennas 2480a-n are attached to the housing and electrically coupled to the transceiver 2476.

The various components of the gNB 2460 are coupled together by a bus system 2411, which may include a power bus, a control signal bus and a status signal bus, in addition to a data bus. However, for the sake of clarity, the various buses are illustrated in FIG. 24 as the bus system 2411. The gNB 2460 may also include a digital signal processor (DSP) 2413 for use in processing signals. The gNB 2460 may also include a communications interface 2415 that provides user access to the functions of the gNB 2460. The gNB 2460 illustrated in FIG. 24 is a functional block diagram rather than a listing of specific components.

Figure 25:
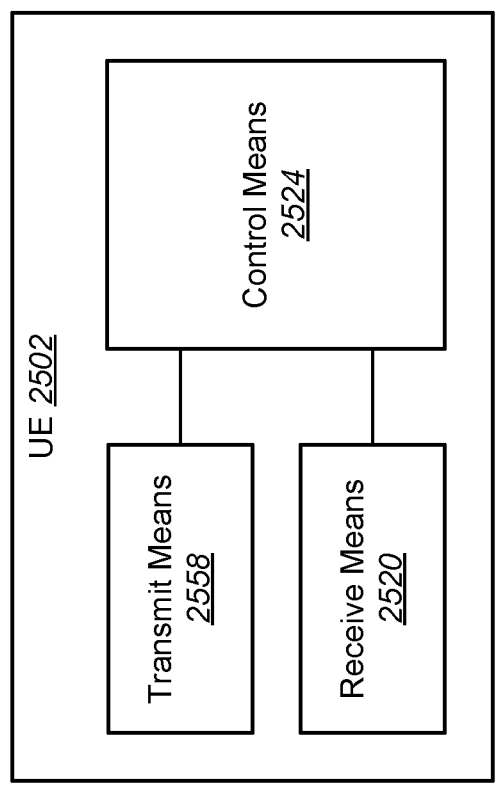
FIG. 25 is a block diagram illustrating one implementation of a UE in which systems and methods for downlink semi-persistent scheduling may be implemented.

FIG. 25 is a block diagram illustrating one implementation of a UE 2502 in which systems and methods for downlink semi-persistent scheduling may be implemented. The UE 2502 includes transmit means 2558, receive means 2520 and control means 2524. The transmit means 2558, receive means 2520 and control means 2524 may be configured to perform one or more of the functions described in connection with FIG. 1 above. FIG. 23 above illustrates one example of a concrete apparatus structure of FIG. 25. Other various structures may be implemented to realize one or more of the functions of FIG. 1. For example, a DSP may be realized by software.

Figure 26:
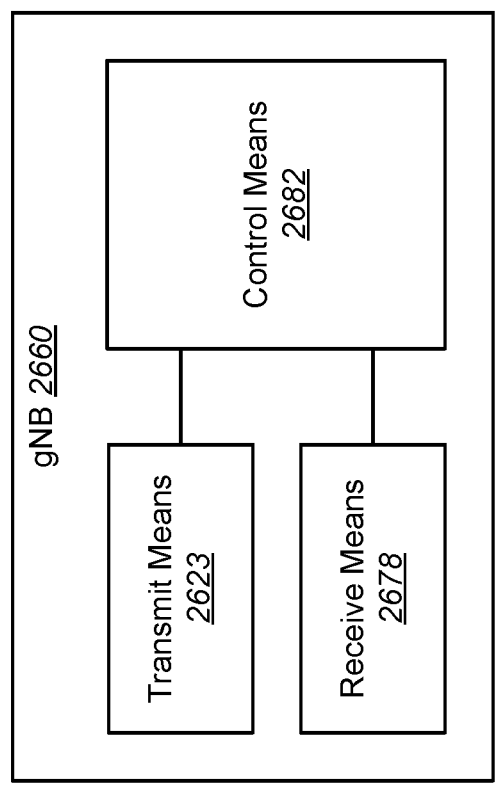
FIG. 26 is a block diagram illustrating one implementation of a gNB in which systems and methods for downlink semi-persistent scheduling may be implemented.

FIG. 26 is a block diagram illustrating one implementation of a gNB 2660 in which systems and methods for downlink semi-persistent scheduling may be implemented. The gNB 2660 includes transmit means 2623, receive means 2678 and control means 2682. The transmit means 2623, receive means 2678 and control means 2682 may be configured to perform one or more of the functions described in connection with FIG. 1 above. FIG. 24 above illustrates one example of a concrete apparatus structure of FIG. 26. Other various structures may be implemented to realize one or more of the functions of FIG. 1. For example, a DSP may be realized by software.

Figure 27:
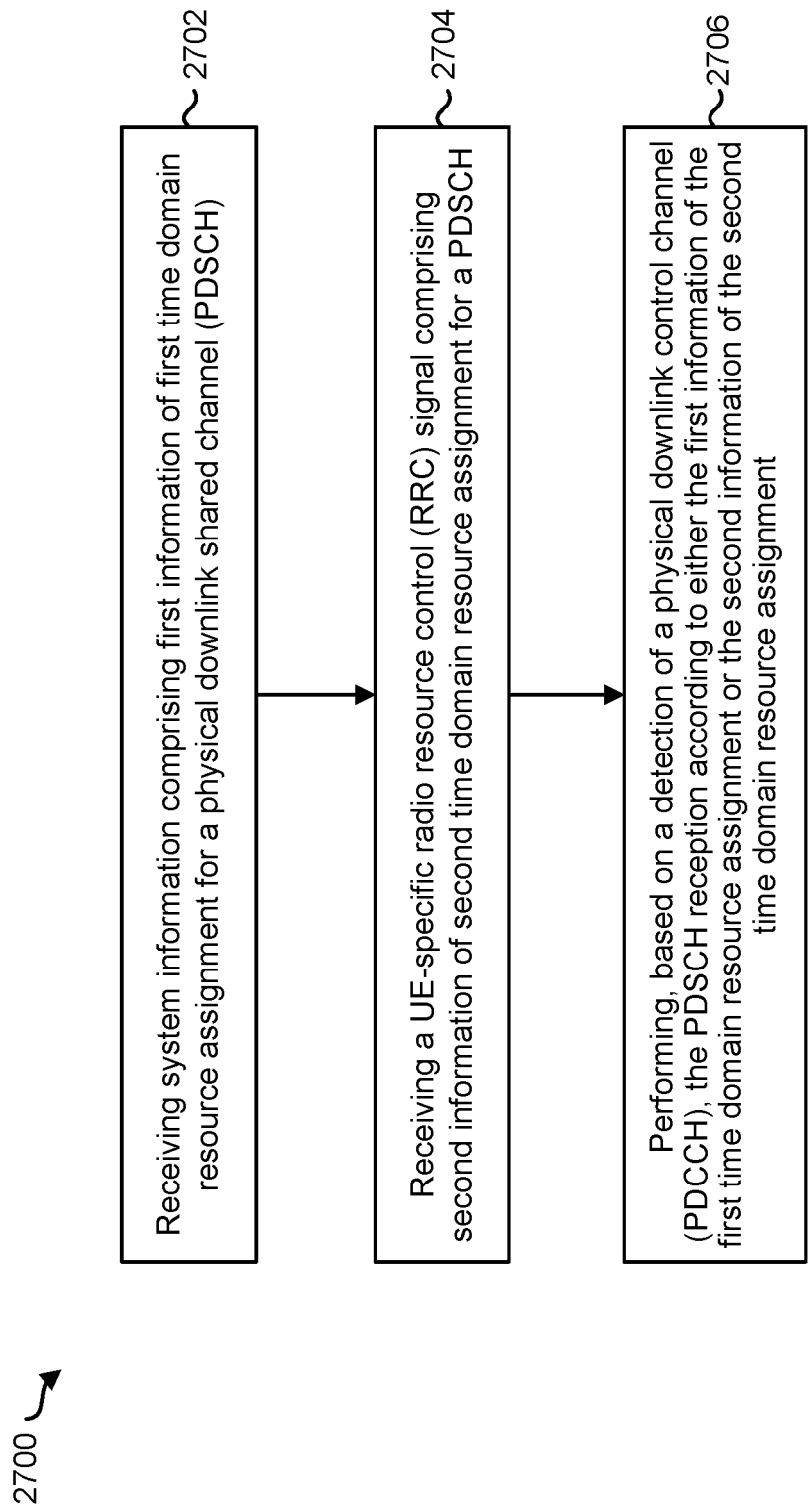
FIG. 27 is a flow diagram illustrating a communication method of a user equipment.

FIG. 27 is a flow diagram illustrating a communication method 2700 of a user equipment 102. The communication method 2700 may include receiving 2702 system information comprising first information of first time domain resource assignment for a physical downlink shared channel (PDSCH). The communication method 2700 may also include receiving 2704 a UE-specific radio resource control (RRC) signal comprising second information of second time domain resource assignment for a PDSCH. The communication method 2700 may also include performing 2706, based on a detection of a physical downlink control channel (PDCCH), the PDSCH reception according to either the first information of the first time domain resource assignment or the second information of the second time domain resource assignment. In a case that the first information of the first time domain resource assignment is configured and the second information of the second time domain resource assignment is configured, the second information of the second time domain resource assignment overrides the first information of the first time domain resource assignment, and the second information of the second time domain resource assignment is used for the PDSCH reception.

Figure 28:
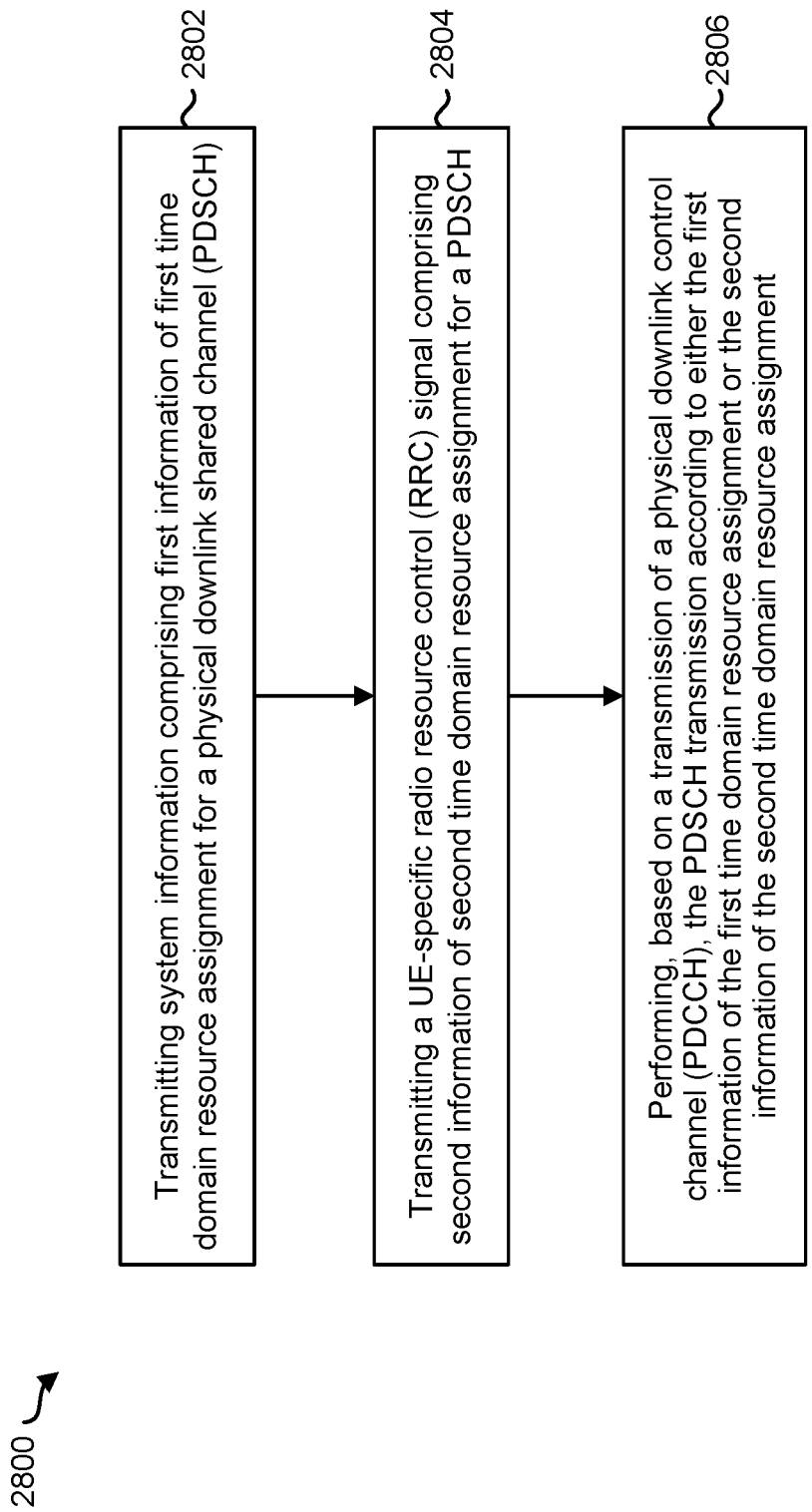
FIG. 28 is a flow diagram illustrating a communication method of a base station apparatus.

FIG. 28 is a flow diagram illustrating a communication method 2800 of a base station apparatus 160. The communication method 2800 may include transmitting 2802 system information comprising first information of first time domain resource assignment for a physical downlink shared channel (PDSCH). The communication method 2800 may also include transmitting 2804 a UE-specific radio resource control (RRC) signal comprising second information of second time domain resource assignment for a PDSCH. The communication method 2800 may also include performing 2806, based on a transmission of a physical downlink control channel (PDCCH), the PDSCH transmission according to either the first information of the first time domain resource assignment or the second information of the second time domain resource assignment. In a case that the first information of the first time domain resource assignment is configured and the second information of the second time domain resource assignment is configured, the second information of the second time domain resource assignment overrides the first information of the first time domain resource assignment, and the second information of the second time domain resource assignment is used for the PDSCH transmission.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE) comprising:
   receiving circuitry,
   transmitting circuitry,
   a processor, and
   a memory; wherein,
   the receiving circuitry is configured to:
      receive system information comprising first information of a first time domain resource assignment including a first slot offset (K0) for a physical downlink shared channel (PDSCH),
      receive a dedicated radio resource control (RRC) signal comprising second information of a second time domain resource assignment including a second slot offset (K0) for the PDSCH,
      detect a physical downlink control channel (PDCCH), wherein
      the first time domain resource assignment for the PDSCH and the second time domain resource assignment for the PDSCH are each a time domain resource assignment based on a slot offset (K0) between a first slot at which the PDCCH is detected and a second slot at which the PDSCH is received,
      perform, in response to detecting the PDCCH, the reception of the PDSCH based on one of: the first information or the second information; and
      use, in response to the detection of the PDCCH regardless of which PDSCH scheduling DCI format is detected, the second information for the reception of the PDSCH when both the first information and the second information have been received and the second information has overridden the first information.

2. The user equipment according to claim 1, wherein the receiving circuitry is further configured to:
   use, in response to the detection of the PDCCH, the first information for the reception of the PDSCH when the first information has been received and the first information has not yet been overridden by the second information or when the first information has been received and the second information has not yet been received.

3. The user equipment according to claim 1, wherein the system information is remaining minimum system information.

4. The user equipment according to claim 1, wherein the receiving circuitry is further configured to:
   use the detected PDCCH for receiving downlink control information with a cyclic redundancy check (CRC) scrambled by a configured scheduling radio network temporary identifier (CS-RNTI).

5. The user equipment according to claim 1, wherein the transmitting circuitry is configured to:
   transmit, in response to the reception of the PDSCH, a hybrid automatic request-ack (HARQ-ACK).

6. The user equipment according to claim 1, wherein
   the first information of the first time domain resource assignment comprises a first set of timing information for the reception of the PDSCH, and
   the second information of the second time domain resource assignment comprises a second set of timing information for the reception of the PDSCH; wherein
   the receiving circuitry is further configured to:
   use, when the first information of the first time domain resource assignment is used for the PDSCH reception in response to detecting the PDCCH, a first one timing information among the second set of timing information, indicated by the detected PDCCH, for the reception of the PDSCH; and
   use, when the second information of the second time domain resource assignment is used for the PDSCH reception in response to detecting the PDCCH, a second one timing information among the first set of timing information, indicated by the detected PDCCH, for the reception of the PDSCH.

7. A base station apparatus comprising:
   receiving circuitry,
   transmitting circuitry,
   a processor,
   and a memory; wherein,
   the transmitting circuitry is configured to:
      transmit system information comprising first information of a first time domain resource assignment including a first slot offset (K0) for a physical downlink shared channel (PDSCH),
      transmit a dedicated radio resource control (RRC) signal comprising second information of a second time domain resource assignment including a second slot offset (K0) for the PDSCH,
      transmit a physical downlink control channel (PDCCH), wherein
      the first time domain resource assignment for the PDSCH and the second time domain resource assignment for the PDSCH are each a time domain resource assignment based on a slot offset (K0) between a first slot at which the PDCCH is transmitted and a second slot at which the PDSCH is transmitted, perform, in response to transmitting the PDCCH, the transmission of the PDSCH based on one of: the first information or the second information; and use, in response to the transmission of the PDCCH regardless of which PDSCH scheduling DCI format is detected, the second information for the transmission of the PDSCH when both the first information and the second information have been transmitted and the second information has overridden the first information.

8. The base station apparatus according to claim 7, wherein the transmitting circuitry is further configured to:
use, in response to the transmission of the PDCCH, the first information for the transmission of the PDSCH when the first information has been transmitted and the first information has not yet been overridden by the second information or when the first information has been transmitted and the second information has not yet been transmitted.

9. The base station apparatus according to claim 7, wherein
the system information is remaining minimum system information.

10. The base station apparatus according to claim 7, wherein the transmitting circuitry is further configured to:
use the detected PDCCH for transmitting downlink control information with a cyclic redundancy check (CRC) scrambled by a configured scheduling radio network temporary identifier (CS-RNTI).

11. The base station apparatus according to claim 7, wherein the receiving circuitry is configured to:
receive, in response to the transmission of the PDSCH, a hybrid automatic repeat request-ack (HARQ-ACK).

12. The base station apparatus according to claim 7, wherein
the first information of the first time domain resource assignment comprises a first set of timing information for the transmission of the PDSCH, and
the second information of the second time domain resource assignment comprises a second set of timing information for the transmission of the PDSCH; wherein
the transmitting circuitry is further configured to:
use, when the first information of the first time domain resource assignment is used for the PDSCH transmission in response to transmitting the PDCCH, a first one timing information among the second set of timing information, indicated by the transmitted PDCCH, for the transmission of the PDSCH; and
use, when the second information of the second time domain resource assignment is used for the PDSCH transmission in response to transmitting the PDCCH, a second one timing information among the first set of timing information, indicated by the transmitted PDCCH, for the transmission of the PDSCH.

13. A communication method of a user equipment (UE) comprising:
receiving system information comprising first information of a first time domain resource assignment including a first slot offset (K0) for a physical downlink shared channel (PDSCH);
receiving a dedicated radio resource control (RRC) signal comprising second information of a second time domain resource assignment including a second slot offset (K0) for the PDSCH;
detecting a physical downlink control channel (PDCCH), wherein the first time domain resource assignment for the PDSCH and the second time domain resource assignment for the PDSCH are each a time domain resource assignment based on a slot offset (K0) between a first slot at which the PDCCH is detected and a second slot at which the PDSCH is received;
performing, in response to detecting the PDCCH, the reception of the PDSCH based on one of: the first information or the second information; and
using, in response to the detection of the PDCCH regardless of which PDSCH scheduling DCI format is detected, the second information for the reception of the PDSCH when both the first information and the second information have been received and the second information has overridden the first information.

\* \* \* \* \*